(12) United States Patent
Matsukura et al.

(10) Patent No.: US 7,848,309 B2
(45) Date of Patent: Dec. 7, 2010

(54) RELAY APPARATUS, RELAY METHOD, AND RELAY PROGRAM

(75) Inventors: Ryuichi Matsukura, Kawasaki (JP); Hitoshi Yamauchi, Hamamatsu (JP); Motoshi Sumioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 11/837,245

(22) Filed: Aug. 10, 2007

(65) Prior Publication Data
US 2008/0037457 A1  Feb. 14, 2008

(30) Foreign Application Priority Data
Aug. 10, 2006 (JP) ............... 2006-218482

(51) Int. Cl.
*H04L 12/28* (2006.01)

(52) U.S. Cl. ....................... 370/351

(58) Field of Classification Search ........... None
See application file for complete search history.

(56) References Cited

U.S. PATENT DOCUMENTS

| | | | |
|---|---|---|---|
| 6,618,380 B1 * | 9/2003 | Mehta et al. | 370/395.42 |
| 7,327,729 B2 * | 2/2008 | Kawaguchi et al. | 370/389 |
| 7,525,970 B2 * | 4/2009 | Mangin et al. | 370/395.21 |
| 2004/0066763 A1 | 4/2004 | Hashimoto et al. | |
| 2004/0085959 A1 * | 5/2004 | Ohkawa | 370/389 |
| 2004/0156364 A1 * | 8/2004 | Kawaguchi et al. | 370/389 |
| 2004/0170186 A1 | 9/2004 | Shao et al. | |
| 2005/0047364 A1 | 3/2005 | Matsukura et al. | |
| 2005/0227698 A1 | 10/2005 | Nonin et al. | |
| 2007/0036181 A1 * | 2/2007 | Nagasawa | 370/536 |

(Continued)

FOREIGN PATENT DOCUMENTS

CN   1345499 A   4/2002

(Continued)

OTHER PUBLICATIONS

European Search Report dated Nov. 19, 2007 issued in corresponding European Application No. 07 11 4050.

(Continued)

*Primary Examiner*—Chi H Pham
*Assistant Examiner*—Fan Ng
(74) *Attorney, Agent, or Firm*—Westerman, Hattori, Daniels & Adrian, LLP

(57) ABSTRACT

A relay apparatus includes: a priority table for storing a higher priority transmission identifier and transmission condition data; a bandwidth management part for determining whether or not a received transmission identifier should be recorded in the priority table as a higher priority transmission identifier; a priority control part for relaying the transmission identified by the higher priority transmission identifier by priority; a monitoring part for monitoring a transmission condition of the wireless terminals and storing a value indicating a degree of degradation of the transmission condition as transmission condition data in the priority table; and a lower priority transmission identifying part for selecting a transmission with a higher degree of degradation of a transmission condition as a lower priority transmission in the case where a total bandwidth in use for transmissions indicated by the higher priority transmission identifiers exceeds a predetermined threshold value. The priority control part relays the transmissions other than the lower priority transmission, by priority compared with the lower priority transmission.

9 Claims, 13 Drawing Sheets

U.S. PATENT DOCUMENTS

2007/0086355 A1* 4/2007 Sawada et al. ............... 370/252
2009/0147792 A1* 6/2009 Anschutz et al. ....... 370/395.21

FOREIGN PATENT DOCUMENTS

| CN | 1527538 A | 9/2004 |
|----|-----------|--------|
| DE | 199 07 085 C1 | 4/2000 |
| EP | 1 003 302 A2 | 5/2000 |
| EP | 1 003 302 A3 | 5/2000 |
| JP | 10-164017 A | 6/1998 |
| JP | 2003-87170 A | 3/2003 |
| JP | 2004-128603 A | 4/2004 |
| JP | 2005-80157 A | 3/2005 |
| JP | 2005-277862 A | 10/2005 |
| WO | 00/57606 A1 | 9/2000 |

OTHER PUBLICATIONS

Chinese Office Action dated Nov. 13, 2009, issued in corresponding Chinese Patent Application No. 2007101403298.

* cited by examiner

| Number | Call originating terminal | | Call receiving terminal | | Transmission priority | Transmission condition data |
|---|---|---|---|---|---|---|
| | IP address | Port number | IP address | Port number | | |
| 1 | 10.10.1.3 | 1234 | 10.10.5.3 | 1234 | Higher priority | 4%,9% |
| 2 | 10.10.11.3 | 1235 | 10.10.12.4 | 1236 | Lower priority | 11%,12% |
| 3 | | | | | | |
| 4 | | | | | | |
| 5 | | | | | | |

| Number | Call originating terminal | | Call receiving terminal | | Transmission priority | Duration of degradation | Transmission condition data |
|---|---|---|---|---|---|---|---|
| | IP address | Port number | IP address | Port number | | | |
| 1 | 10.10.1.3 | 1234 | 10.10.5.3 | 1234 | Higher priority | 0 | 4%,9% |
| 2 | 10.10.11.3 | 1235 | 10.10.12.4 | 1236 | Degraded | 2 | 11%,12% |
| 3 | 10.10.11.2 | 1235 | 10.10.12.5 | 1236 | Lower priority | 1 | 20%,31% |
| 4 | 10.10.11.2 | 1235 | 10.10.12.5 | 1236 | Higher priority | 1 | 2%,6% |
| 5 | | | | | | | |

| Channel number difference | 0 | 1 | 2 | 3 | 4 |
|---|---|---|---|---|---|
| Influence degree | 100% | 80% | 60% | 40% | 0% |

FIG. 10

RELAY APPARATUS, RELAY METHOD, AND RELAY PROGRAM

BACKGROUND OF THE INVENTION

1. Field of the Invention

The present invention relates to a relay apparatus for relaying transmission among a plurality of wireless terminals in a coverage area of the relay apparatus with a limited bandwidth, like an access point in a wireless LAN (local area network).

2. Description of Related Art

Recently, for example, as in an IP telephone via a wireless LAN, a wireless terminal that performs a telephone conversion via radio transmission has become widespread. The wireless terminal that performs a telephone call via radio transmission enables a telephone call with a terminal on a partner side by performing radio transmission with a relay apparatus (e.g., an access point of a wireless LAN, etc.). In such a transmission form, mobile terminals are present in a coverage area of a relay apparatus, whereby simultaneous telephone calls by the mobile terminals occur. In this case, those mobile terminals share a transmission bandwidth available in the relay apparatus, and perform transmission respectively. Therefore, when the number of mobile terminals that perform telephone calls simultaneously via one relay apparatus increases, the transmission bandwidth becomes insufficient. Consequently, at a mobile terminal, delays in voice data transmission from a terminal on a partner side are increased, and a noise such as a sound break occurs. This problem may occur in the case of communicating data such as music or a moving picture by streaming, as well as in the case of a telephone call.

As a method for preventing the shortage of a transmission bandwidth in a relay apparatus, for example, the following method has been proposed: in a system for distributing a time-varying image to a wireless terminal via a relay apparatus from an image transmission apparatus, a part of an image frame contained in the time-varying image to be distributed to the wireless terminal is discarded when the transmission condition in a wireless zone between the relay apparatus and the wireless terminal degrades (e.g., see JP 2003-87170 A).

SUMMARY OF THE INVENTION

However, the above-described conventional method is intended for only wireless terminals under a degraded transmission condition, and a mechanism is not provided for stably and efficiently utilizing a limited bandwidth available for a transmission between a relay apparatus and a wireless terminal. Therefore, the above-described conventional method is insufficient for securing a stable transmission quality by taking influences of the degree of congestion of transmissions by a plurality of wireless terminals, changes in the radio wave conditions, etc. into consideration.

Therefore, it is an object of the present invention to provide a relay apparatus, a relay method, and a relay program that makes it possible to stably and efficiently utilizing a limited bandwidth available for a transmission between a relay apparatus and a wireless terminal.

A relay apparatus according to the present invention is a relay apparatus for relaying a transmission by a wireless terminal present in a coverage area of the relay apparatus, and the relay apparatus includes: a priority table for storing a higher priority transmission identifier for identifying a transmission to be relayed by priority, and transmission condition data representing a transmission condition between the relay apparatus and a wireless terminal that is to perform the transmission identified by the higher priority transmission identifier; a bandwidth management part for receiving a transmission identifier that identifies a transmission that the wireless terminal is to start, and determining whether or not the received transmission identifier should be recorded in the priority table as a higher priority transmission identifier based on a predetermined criterion; a priority control part for relaying the transmission identified by the higher priority transmission identifier recorded in the priority table, by priority compared with the other transmissions; a monitoring part for monitoring a transmission condition between the relay apparatus and the wireless terminal that is to perform the transmission identified by the higher priority transmission identifier recorded in the priority table, so as to obtain a value indicating a degree of degradation of the transmission condition at predetermined time intervals and record the obtained value as transmission condition data in the priority table; and a lower priority transmission identifying part for calculating a total bandwidth in use as a sum of a bandwidth used for a transmission identified by a higher priority transmission identifier recorded in the priority table, and when the total bandwidth in use exceeds a predetermined threshold value, selecting as a lower priority transmission a transmission with a higher degree of degradation of a transmission condition than those of the other transmissions, among the transmissions identified by the higher priority transmission identifiers recorded in the priority table. In the relay apparatus, the priority control part relays the transmissions other than the lower priority transmission selected by the lower priority transmission identifying part among the transmissions identified by the higher priority transmission identifiers recorded in the priority table, by priority compared with the lower priority transmission.

The bandwidth management part determines whether or not the received transmission identifier should be recorded in the priority table as a higher priority transmission identifier based on a predetermined criterion, whereby the transmission relayed by priority by the priority control part is managed by the bandwidth management part based on the predetermined criterion. The monitoring part obtains a value indicating a degree of degradation of the transmission condition at predetermined time intervals and records the obtained value as transmission condition data in the priority table, whereby the fluctuations of the transmission condition of the transmission relayed by priority are reflected in the transmission condition data in the priority table. When a total bandwidth in use as a sum of a bandwidth used for a transmission identified by a higher priority transmission identifier exceeds a predetermined threshold value, the lower priority transmission identifying part selects as a lower priority transmission a transmission with a higher degree of degradation of a transmission condition indicated by the transmission condition data, than those of the other transmissions, among the transmissions identified by the higher priority transmission identifiers recorded in the priority table. By so doing, when the bandwidth used by the relay apparatus for relaying transmissions is insufficient, the lower priority transmission identifying part can select, as a lower priority transmission, a transmission that possibly causes the bandwidth in use to expand because of the degradation of the transmission condition. The priority control part relays the transmissions other than the lower priority transmission selected by the lower priority transmission identifying part, by priority compared with the lower priority transmission. This allows a transmission under a less degraded transmission condition to be relayed by priority compared with a transmission under a degraded transmission condition that possibly causes the bandwidth used for the transmission to expand. Consequently, even when the bandwidth used by the relay apparatus for relaying transmissions is insufficient, the quality of transmissions under less degraded transmission conditions can be ensured. In other words, this makes it possible to prevent a degraded transmission condition of a transmission by a wireless terminal from expanding the bandwidth used for the transmission and thereby impairing the quality of a transmission by another wireless terminal. Further, this also makes it possible to stably and efficiently utilize a limited bandwidth available for the relay apparatus according to the fluctuations of the transmission condition.

In the relay apparatus according to the present invention, the monitoring part preferably monitors fluctuations of a link speed of a transmission identified by a higher priority transmission identifier recorded in the priority table, and obtains a value indicating a period during which the link speed is lower than a predetermined speed in a predetermined time, as a value indicating a degree of degradation of the transmission condition.

The link speed of a certain transmission fluctuates according to the transmission condition between a wireless terminal and a relay apparatus engaged in the transmission. In other words, when the transmission condition between the wireless terminal and the relay apparatus degrades, a function of decreasing the link speed operates so as to ensure the transmission quality, thereby decreasing the link speed of the transmission. Therefore, the monitoring part is allowed to monitor the fluctuations of the link speed, obtain a duration in which the link speed is lower than the predetermined speed within a predetermined time, and use the duration as a value indicting the degree of degradation of the transmission condition.

In the relay apparatus according to the present invention, the monitoring part preferably monitors the number of times of retransmitting packets in a transmission identified by a higher priority transmission identifier recorded in the priority table, and obtains a value indicating the number of times of retransmitting the packets within a predetermined time as a value indicating a degree of degradation of the transmission condition.

When a transmission condition for a certain transmission between a wireless terminal and a relay apparatus degrades, the number of times of retransmitting packets for the transmission within a predetermined time increases. Therefore, the monitoring part obtains the number of times of retransmitting packets within a predetermined time, and uses the value indicating the number of times of retransmission as a value indicating the degree of degradation of the transmission condition.

The relay apparatus according to the present invention preferably further includes a packet transmission control part for discarding at least a part of packets to be transmitted to a wireless terminal in the lower priority transmission selected by the lower priority transmission identifying part.

This allows the packet transmission control part to reduce the amount of packets of a transmission transmitted under a degraded transmission condition between the wireless terminal and the relay apparatus. This makes it possible to suppress the expansion of a bandwidth used for a transmission under a degraded transmission condition.

The relay apparatus according to the present invention preferably further includes a packet transmission control part for discarding packets to be sent to a wireless terminal in the lower priority transmission selected by the lower priority transmission identifying part, and transmitting a dummy packet having a smaller data amount than that of the discarded packets.

This allows the packet transmission control part to reduce the size of packets of a transmission transmitted under a degraded transmission condition between the wireless terminal and the relay apparatus. This makes it possible to suppress the expansion of a bandwidth used for a transmission under a degraded transmission condition.

In the relay apparatus according to the present invention, the lower priority transmission identifying part preferably obtains an adjacent bandwidth in use indicating a bandwidth used for a radio transmission by an adjacent relay apparatus, and performing the selection of a lower priority transmission when a sum of the total bandwidth in use and a value obtained by multiplying the adjacent bandwidth in use by a coefficient indicating a degree of influence by the adjacent relay apparatus exceeds the predetermined threshold value.

This allows the lower priority transmission identifying part to determine whether or not the bandwidth for the relay apparatus is insufficient, with the influences of interference of radio waves of an adjacent relay apparatus being taken into consideration. When the bandwidth for the relay apparatus is determined to be insufficient, the lower priority transmission identifying part performs the selection of a lower priority transmission.

In the relay apparatus according to the present invention, preferably the relay apparatus is connected with a transmission control device for controlling transmissions by a plurality of terminals including the wireless terminal, and the relay apparatus further includes a call control part for transmitting, to the transmission control device, a request for reducing a bandwidth used for a lower priority transmission selected by the lower priority transmission identifying part.

This allows the call control part to reduce the bandwidth used for a transmission under a degraded transmission condition. Therefore, the expansion of a bandwidth used for a transmission under a degraded transmission condition can be suppressed.

A relay method according to the present invention is a relay method for relaying a transmission by a wireless terminal present in a coverage area, and the method includes: a priority table storing operation for storing, in a priority table, a higher priority transmission identifier for identifying a transmission to be relayed by priority, and transmission condition data representing a transmission condition between the relay apparatus and a wireless terminal that is to perform the transmission identified by the higher priority transmission identifier; a bandwidth management operation for receiving a transmission identifier that identifies a transmission that the wireless terminal is to start, and determining whether or not the received transmission identifier should be recorded in the priority table as a higher priority transmission identifier based on a predetermined criterion; a priority control operation for relaying the transmission identified by the higher priority transmission identifier recorded in the priority table, by priority compared with the other transmissions; a monitoring operation for monitoring a transmission condition between the relay apparatus and the wireless terminal that is to perform the transmission identified by the higher priority transmission identifier recorded in the priority table, so as to obtain a value indicating a degree of degradation of the transmission condition at predetermined time intervals and record the obtained value as transmission condition data in the priority table; and a lower priority transmission identifying operation for calculating a total bandwidth in use as a sum of a bandwidth used for a transmission identified by a higher priority transmission identifier recorded in the priority table, and when the total bandwidth in use exceeds a predetermined threshold value, selecting as a lower priority transmission a transmission with a higher degree of degradation of a transmission condition than those of the other transmissions, among the transmissions identified by the higher priority transmission identifiers recorded in the priority table. In the priority control operation, the transmissions other than the lower priority transmission selected by the lower priority transmission identifying operation, among the transmissions identified by the higher priority transmission identifiers recorded in the priority table, are relayed by priority compared with the lower priority transmission.

A relay program according to the present invention is a relay program for causing a computer to execute processing of relaying a transmission by a wireless terminal present in a coverage area, and the relay program causes the computer to execute: priority table storing processing of storing, in a priority table, a higher priority transmission identifier for identifying a transmission to be relayed by priority, and transmission condition data representing a transmission condition between the relay apparatus and a wireless terminal that is to perform the transmission identified by the higher priority transmission identifier; bandwidth management processing of receiving a transmission identifier that identifies a transmission that the wireless terminal is to start, and determining whether or not the received transmission identifier should be recorded in the priority table as a higher priority transmission identifier based on a predetermined criterion; priority control processing of relaying the transmission identified by the higher priority transmission identifier recorded in the priority table, by priority compared with the other transmissions; monitoring processing of monitoring a transmission condition between the relay apparatus and the wireless terminal that is to perform the transmission identified by the higher priority transmission identifier recorded in the priority table, so as to obtain a value indicating a degree of degradation of the transmission condition at predetermined time intervals and record the obtained value as transmission condition data in the priority table; and lower priority transmission identifying processing of calculating a total bandwidth in use as a sum of a bandwidth used for a transmission identified by a higher priority transmission identifier recorded in the priority table, and when the total bandwidth in use exceeds a predetermined threshold value, selecting as a lower priority transmission a transmission with a higher degree of degradation of a transmission condition than those of the other transmissions, among the transmissions identified by the higher priority transmission identifiers recorded in the priority table. In the priority control processing, the transmissions other than the lower priority transmission selected by the lower priority transmission identifying processing, among the transmissions identified by the higher priority transmission identifiers recorded in the priority table, are relayed by priority compared with the lower priority transmission.

According to the present invention, it is possible to provide a relay apparatus, a relay method, and a relay program that make it possible to stably and efficiently utilize a limited bandwidth available for a transmission between a relay apparatus and a wireless terminal.

BRIEF DESCRIPTION OF THE DRAWINGS

FIG. 2 illustrates a specific example of data recorded in a priority table.

FIG. 7 illustrates a data configuration of a priority table according to Embodiment 2.

FIG. 10 is a table showing the exemplary relationship between differences between channel numbers of adjacent APs and values indicating degrees of influence on respective adjacent APs.

DETAILED DESCRIPTION OF THE INVENTION

Embodiment 1

Figure 1:
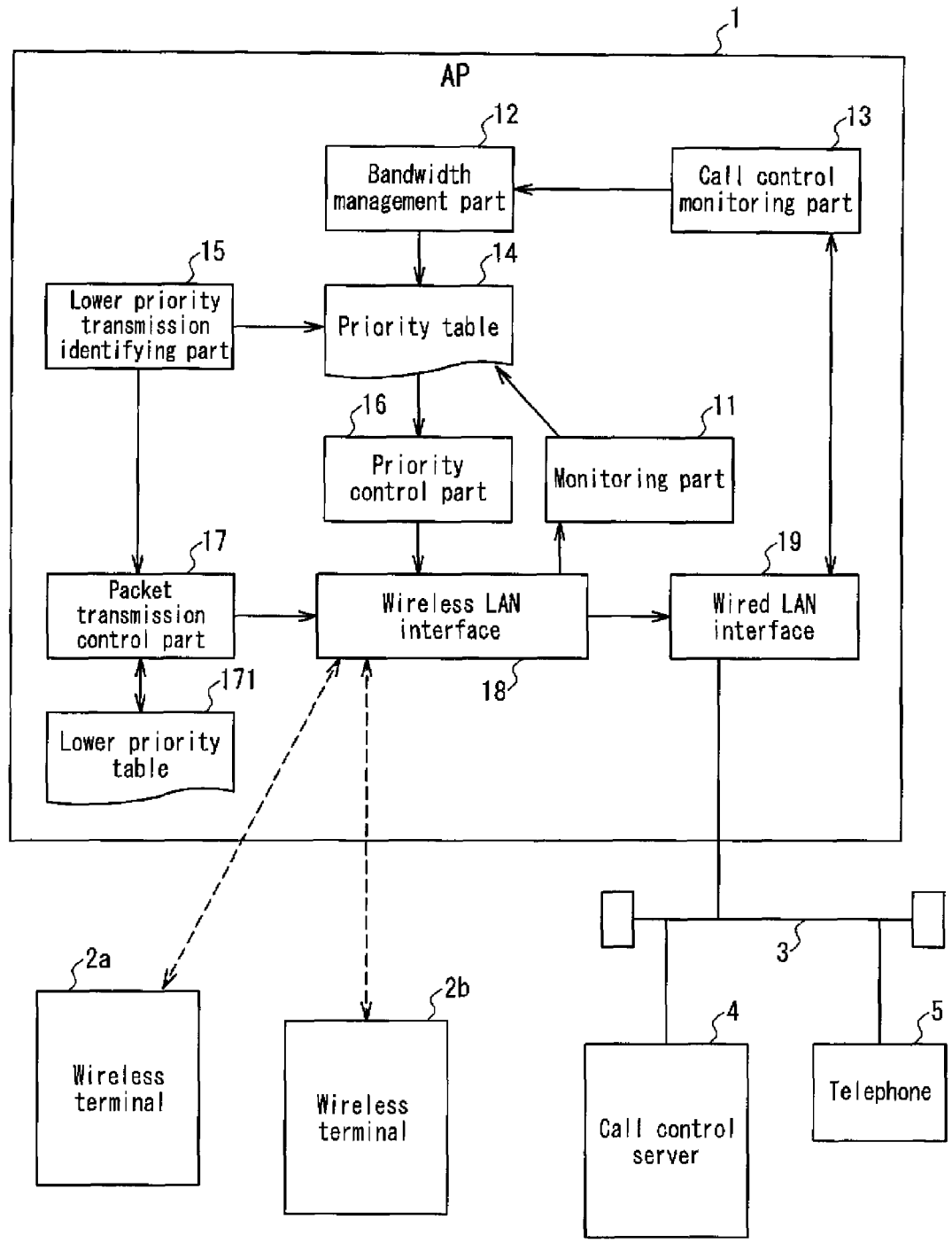
FIG. 1 is a functional block diagram showing a configuration of a communication system including an access point (AP) according to Embodiment 1.

The present embodiment is an exemplary embodiment in the case where a relay apparatus is a wireless LAN access point (hereinafter referred to as AP). The wireless LAN is within the specification of a short-haul wireless network according to the IEEE 802.11 standard. FIG. 1 is a functional block diagram showing a configuration of the AP according to the present embodiment, together with an overall configuration of an entire communication system incorporating the foregoing AP. The communication system shown in FIG. 1 is, for example, a system that enables telephone calls over wireless IP telephones utilizing the wireless LAN.

The communication system shown in FIG. 1 includes an AP 1, a call control server 4, and a telephone 5 connected with a wired LAN 3, and wireless terminals 2a and 2b in a coverage area of the AP1. The wireless terminals 2a and 2b and the telephone 5 have functions as IP telephone terminals. It should be noted that the number of the AP connected with the wired LAN 3 is not limited to one as shown in FIG. 1. Further, the number of the wireless terminals presented in the coverage area of the AP 1 is not limited to two. Still further, apparatuses other than the AP1, the call control server 4, and the telephone 5 may be connected with the wired LAN 3.

The call control server 4 is an exemplary transmission control device, and controls the starting, updating, and terminating of a telephone call between two or more terminals among a plurality of telephone terminals including the wireless terminals 2a and 2b as well as the telephone 5. For example, the call control server 4 receives a request for starting a telephone call (hereinafter referred to as "call starting request"), which has been transmitted from the wireless terminal 2a or 2b or the telephone 5, and generates a call between the terminals between which a telephone call is to be started. The call control server 4 receives a request for terminating a telephone call (hereinafter referred to as "call terminating request"), which has been transmitted from the wireless terminal 2a or 2b or the telephone 5, and performs an operation for terminating a call between the terminals between which a telephone call is to be terminated.

The AP 1 is an apparatus for relaying data transferred in the transmissions of the wireless terminals 2a and 2b in the coverage area of AP1. The AP 1 includes a monitoring part 11, a bandwidth management part 12, a call control monitoring part 13, a priority table 14, a lower priority transmission identifying part 15, a priority control part 16, a packet transmission control part 17, a lower priority table 171, a wireless LAN interface 18, and a wired LAN interface 19.

The hardware composing the AP 1 includes, for example, a wireless LAN control device, a MPU (Micro-Processing Unit), and a recording device such as a RAM, a ROM, etc. The functions of the monitoring part 11, the bandwidth management part 12, the call control monitoring part 13, the lower priority transmission identifying part 15, the priority control part 16, the packet transmission control part 17, the wireless LAN interface 18, and the wired LAN interface 19 are implemented by the MPU executing predetermined programs, or the wireless LAN controlling LSI executing predetermined processing operations. Further, the priority table 14 and the lower priority table 171 are implemented by a recording device. It should be noted that separate pieces of hardware do not necessarily exist corresponding to the above-described functions, respectively.

The wired LAN interface 19 mediates the exchange of data between the AP 1 and the wired LAN 3 in conformity with the specification of the wired LAN. The wireless LAN interface 18 mediates the wireless exchange of data between the wireless terminals 2 and 2b and the AP 1 in conformity with the specification of the wireless LAN. The transmission between the wireless terminals 2a and 2b and the wired LAN 3 is relayed by the wireless LAN interface 18 and the wired LAN interface 19.

The call control monitoring part 13 retrieves a call control message passing through the wired LAN interface 19, and transfers the copy to the bandwidth management part 12. The call control monitoring part 13 retrieves a packet containing call control information from packets passing through the wired LAN interface 19, and obtains a call control message.

The call control message is, for example, a call starting request, a call terminating request, etc. The call starting request contains, for example, data for identifying a call originating terminal and a call receiving terminal, as telephone call identifier for identifying a telephone call that is requested to be started. Likewise, the call terminating request also contains, as a telephone call identifier, data indicating addresses of the call originating terminal and the call receiving terminal for the telephone call ready to be terminated.

The bandwidth management part 12 updates the priority table 14 based on the call control message received from the call control monitoring part 13. In the priority table 14, higher priority transmission identifiers and transmission condition data are recorded. The higher priority transmission identifier indicates transmission to be relayed by priority by the AP 1 (hereinafter referred to as higher priority transmission), and the transmission condition data indicate a condition of a transmission between a wireless terminal and the AP 1. When receiving a call starting request as a call control message, the bandwidth management part 12 determines, based on a predetermined criterion, whether or not the telephone call identifier of the transmission that is requested to be started should be recorded in the priority table 14 as the priority transmission identifier. The above-described criterion is, for example, that the number of the priority transmissions recorded in the priority table does not exceed a predetermined upper limit, that the sum of bandwidths to be used for relaying the higher priority transmissions does not exceed a predetermined value, or the like. Thus, the predetermined criterion is that used for preventing the number of the priority transmissions from exceeding the number of transmissions that can be relayed stably. The above-described predetermined criterion is preferably recorded in a recording device of the AP 1 in advance.

Further, since the bandwidth management part 12 records the transmission identifier identified by the call control message in the priority table 14 as a higher priority transmission identifier, all the higher priority transmissions to be relayed by priority are controlled with use of the call control messages in the present embodiment.

In the present embodiment, the AP 1 identifies one telephone call between certain transmission terminals, or a series of data transmissions between certain transmission terminals, as one transmission. Besides, when transmissions in which different applications are used are made between certain terminals, that is, when different types of transmissions such as a telephone, a mail, and a HTTP transaction are made between certain terminals, these transmissions are identified as different transmissions. This allows the AP 1 to, for example, relay a voice data transmission between IP telephones with a higher priority than the other data transmissions.

Incidentally, the transmission regarded as one transmission by the AP 1 is not limited to the above-described example. For example, all the transmissions between selected terminals may be identified collectively as one transmission.

FIG. 2 illustrates a specific example of data to be recorded in the priority table 14. In the priority table 14 shown in FIG. 2, the IP address and the port number of the call originating terminal, the IP address and port number of the call receiving terminal, the transmission priority, and the transmission condition data are recorded for each transmission to be relayed by priority. Among these, the IP addresses and the port numbers of the call originating terminal and the call receiving terminal are treated as higher priority transmission identifiers. It should be noted that the data format of the priority table 14 is not limited particularly. The priority table 14 may be, for example, recorded as a table in a RDB (relational database) form, or alternatively, as a file.

The IP addresses and the port numbers of the call originating terminal and the call receiving terminal are examples of the higher priority transmission identifier. In the present example, since a network address obtained by combining the IP addresses and the port numbers of the terminals on both sides of a telephone call is used as a higher priority transmission identifier, transmissions even between the same terminals are identified as different transmissions if port numbers for the transmissions are different. It should be noted that when transmissions between selected terminals are identified as one transmission, it is possible to use only IP addresses of the terminals on both sides as the higher priority transmission identifiers.

The transmission priority is data indicating whether the transmission has a higher priority or a lower priority. The transmission condition data are data indicating conditions of transmission between the wireless terminal and the AP 1 that perform the foregoing transmission. Here, data indicating the history of variation of the link speed is one of examples of the transmission condition data.

The priority control part 16 instructs the wireless LAN interface to perform a relaying operation such that the transmission identified with the higher priority transmission identifier recorded in the priority table 14 is relayed by priority compared with the others. As the method for relaying the transmission by priority, for example, the higher priority transmission method according to IEEE 802.11e standard can be used.

The monitoring part 11 obtains a value indicative of a degree of degradation of the transmission condition at predetermined time intervals by monitoring the condition of transmission between the wireless terminal and the AP1 that perform a transmission identified by a higher priority transmission identifier recorded in the priority table, and records the value as the transmission condition data in the priority table 14. The value indicative of the degradation degree of the transmission condition may be a value indicative of conditions of radio waves between the AP 1 and the wireless terminal. For example, when the transmission condition between the wireless terminal 2a and the AP 1 is monitored, the monitoring part 11 obtains a link speed of each packet to be transmitted within a predetermined time from the wireless LAN interface 18 to the wireless terminal 2a. The wireless LAN interface 18 calculates a ratio of packets having link speeds lower than a threshold value among the packets transmitted within a predetermined time. The ratio (hereinafter referred to as lower speed transmission ratio) is used as a value indicative of a degradation degree of the transmission condition within the predetermined time. In the priority table 14 shown in FIG. 2, the transmission condition data are an example of a value indicative of the degradation degree of the transmission condition recorded in the monitoring part 11. In this example, the latest two low speed transmission ratios obtained are recorded as the transmission condition data.

Here, the link speed is the logical maximum data transmission speed between the AP 1 and the wireless terminal. For example, the wireless LAN interface 18 sets a link speed for each packet according to the radio conditions. The IEEE 802.11b specifies the transmission modes with link speeds of 1 Mbps, 2 Mbps, 5.5 Mbps, and 11 Mbps. For example, when the wireless LAN interface 18 is according to the IEEE 802.11b, the wireless LAN interface 18 transmits packets to a wireless terminal at 11 Mbps under normal conditions. When the radio conditions of a wireless terminal degrade, the wireless LAN interface 18 sets the link speed to a lower level (e.g., 5.5 Mbps) to keep quality of the transmission stable and transmits packets.

It should be noted that the value indicative of the degradation degree of the transmission condition obtained by the monitoring part 11 is not limited to the above-described link speed. For example, a packet retransmission ratio within a predetermined period of time may be used as a value indicative of the degradation degree of the transmission condition.

The lower priority transmission identifying part 15 calculates a total allocated bandwidth as a sum of a bandwidth assigned to the transmission indicated by the higher priority transmission identifier recorded in the priority table 14. When the total allocated bandwidth exceeds a predetermined threshold value, among the higher priority transmissions recorded in the priority table 14, a transmission exhibiting a higher degradation degree of a transmission condition than the other transmissions is selected as a lower priority transmission. The bandwidth assigned to each transmission can be determined by, for example, the transmission scheme and the data transfer speed for the transmission. The bandwidth used for the transmission can be represented by, for example, a transfer speed calculated as an amount of data transferred between an AP and a wireless terminal per unit time. Here, the foregoing threshold value is a value recorded preliminarily, and the threshold value can be set to, for example, a bandwidth allocated to the higher priority transmissions, in the bandwidth available for the AP 1 for making transmissions a wireless terminal.

Further, the lower priority transmission identifying part 15 refers to transmission condition data recorded in the priority table 14, and selects a transmission exhibiting a higher degradation degree of the transmission condition than the other transmissions, as a lower priority transmission. For example, when values indicative of degradation degrees of transmission conditions obtained at predetermined time intervals are recorded as transmission condition data regarding each transmission, the lower priority transmission identifying part 15 can select the following transmission as a low priority transmission; a transmission for which degradation degrees higher than a predetermined reference value have been recorded a predetermined number of times (e.g., twice) successively.

The low priority transmission identifying part 15 records information identifying the lower priority transmission in the priority table 14, and notifies the copy to the packet transmission control part 17. The packet transmission control part 17 records the information identifying the lower priority transmission in the lower priority table 171. The priority control part 16 instructs the wireless LAN interface 18 so that the transmissions other than the lower priority transmission selected by the lower priority transmission identifying part 15 among the higher priority transmissions recorded in the priority table 14 are relayed by priority as compared with the lower priority transmission. The packet transmission control part 17 controls a data amount transmitted to a wireless terminal per unit time in the lower priority transmission by controlling the wireless LAN interface based on the information identifying the lower priority transmission recorded in the lower priority table 171. The packet transmission control part 17 instructs the wireless LAN interface to, for example, perform an operation for discarding at least a part of packets to be transmitted to the wireless terminal in the lower priority transmission, or an operation for discarding packets to be transmitted to the wireless terminal in a lower priority transmission and transmitting a dummy packet having a smaller data amount than that of the discarded packets.

Figure 3:
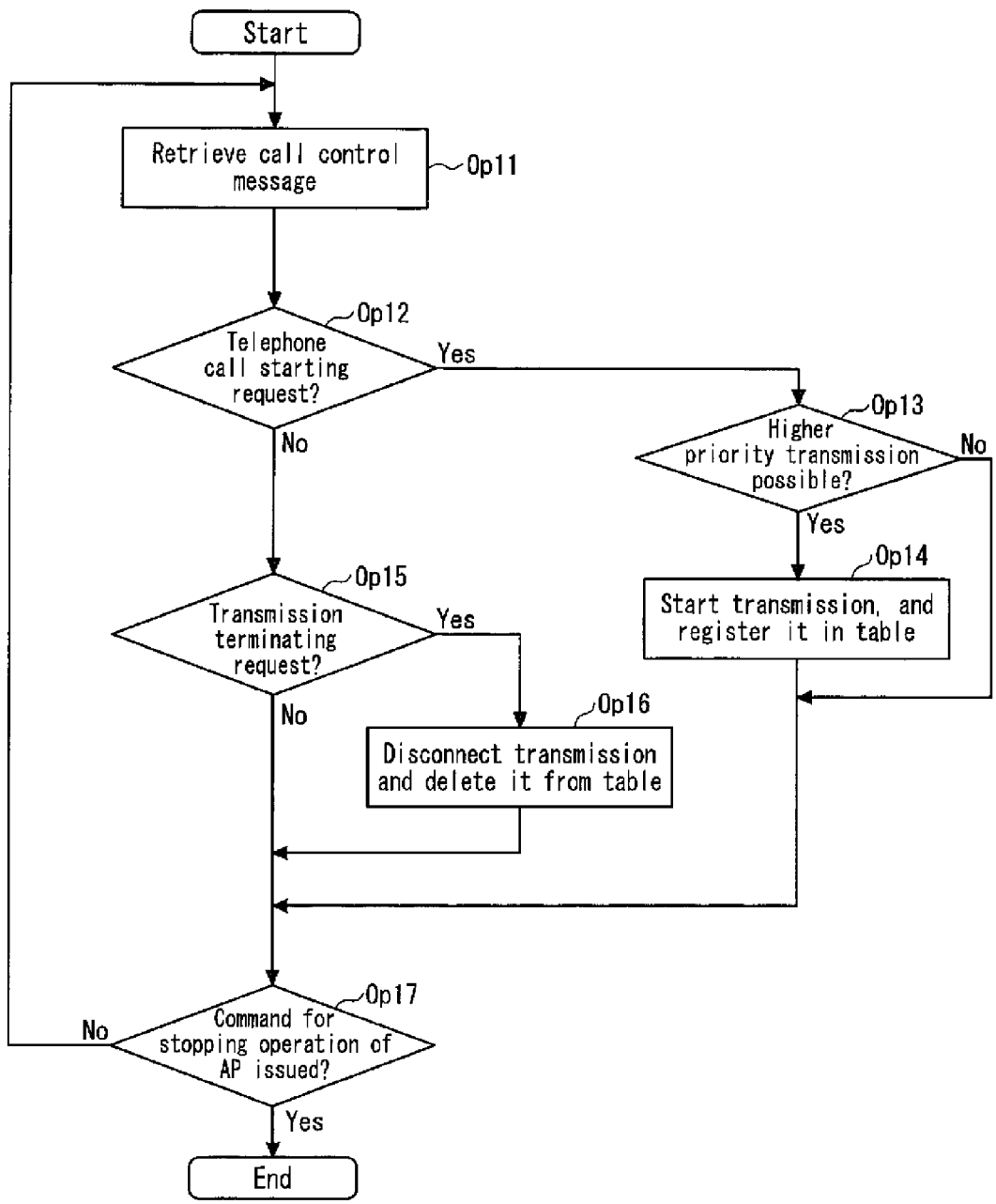
FIG. 3 is a flowchart showing exemplary operations of the AP when a higher priority transmission identifier is recorded or deleted.

Next, an exemplary operation of the AP 1 according to the present embodiment will be described. FIG. 3 is a flowchart showing an exemplary operation of the AP 1 when the priority transmission identifier indicating a higher priority transmission is recorded or deleted in the priority table 14. In the example shown in FIG. 3, the call control monitoring part 13 of the AP 1 first retrieves a call control message passing through the wired LAN interface 19, and notifies the copy to the bandwidth management part 12 (Op11).

When the call control message notified to the bandwidth management part 12 is a telephone call starting request (Yes in Op12), the bandwidth management part 12 determines whether or not the telephone call the starting of which is requested can be assumed to be a higher priority transmission in the AP (Op13). Here, as an example, when the total number of higher priority transmissions does not exceed the predetermined upper limit number of higher priority transmissions in the AP 1 even if a telephone call the starting of which is requested is ranked as a higher priority transmission in the AP 1, the bandwidth management part 12 determines that the foregoing telephone call can be ranked as a higher priority transmission.

In the case of Yes in Op13, the bandwidth management part 12 retrieves, from the call starting request, data for identifying a telephone call to be started, and records the retrieved data as a higher priority transmission identifier in the priority table 14 (Op 14). Examples of the data for identifying a telephone call include respective IP addresses and port numbers of a call originating terminal and a call receiving terminal. A telephone call identified by a higher priority transmission identifier recorded in the priority table 14 is to be relayed by priority by the higher priority control part 16.

When the call control message notified to the bandwidth management part 12 is a call terminating request (in the case of No in Op12 and Yes in Op15), the bandwidth management part 12 deletes, from the priority table 14, the higher priority transmission identifier that identifies the telephone call the terminating of which is requested (Op16). With this, the telephone call to be terminated is deleted from the priority table 14 to be relayed by priority by the AP 1.

When the call control message notified to the bandwidth management part 12 is neither a call starting request nor a call terminating request (No in Op15), the bandwidth management part 12 does not perform an operation in particular. The operations denoted as Op11 to Op16 above are performed repeatedly unless a command for stopping the operation of the AP is issued (unless the result of the determination in Op17 is "Yes").

Figure 4:
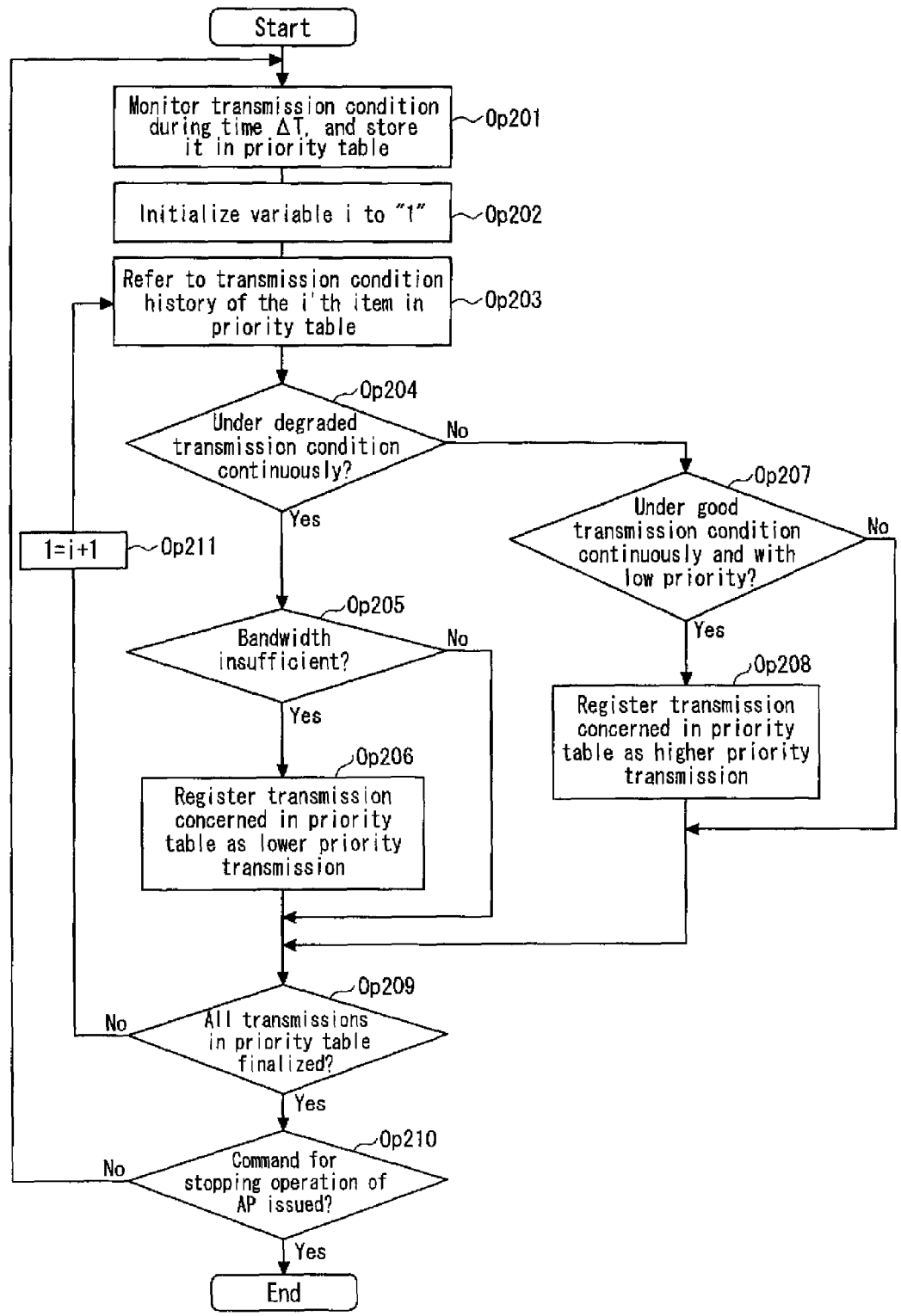
FIG. 4 is a flowchart showing exemplary operations of a monitoring part and a lower priority transmission identifying part of the AP.

Next, exemplary operations of the monitoring part 11 and the lower priority transmission identifying part 15 of the AP 1 will be described, with reference to FIG. 4. In FIG. 4, first, the monitoring part 11 monitors a transmission condition between a wireless terminal and the AP 1, and stores transmission condition data in the priority table 14 (Op201). More specifically, the monitoring part 11 obtains a value indicative of the degradation degree of the transmission condition of the transmission indicated by the higher priority transmission identifier in the priority table at predetermined time intervals, and the values are recorded in the priority table 14 as transmission condition data. Here, an exemplary case in which the transmission condition data are values indicative of the history of the link speeds in the transmission between wireless terminals and the AP 1 (e.g., the history of the lower speed transmission ratios) is described.

Figure 5:
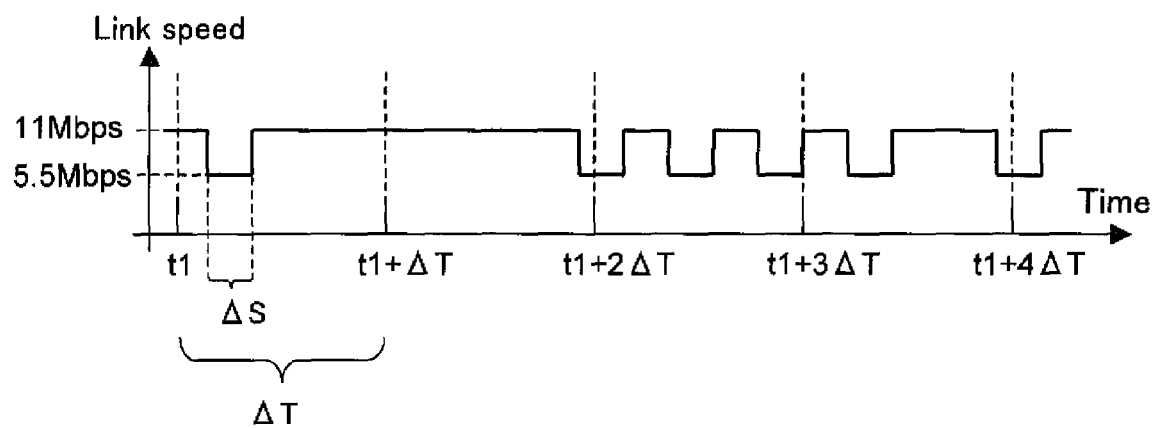
FIG. 5 is a graph showing an exemplary transition of a link speed in the transmission between a wireless terminal and the AP.

FIG. 5 is a graph showing an exemplary transition of the link speed in the transmission between one of wireless terminals and the AP 1. In this graph, the vertical axis represents the link speed and the horizontal axis represents time. For example, when the monitoring part 11 monitors the transition of the link speed as shown in FIG. 5, the monitoring part 11 first obtains a lower speed transmission ratio during a period $\Delta T$ from a time t1 to a time (t1+3$\Delta T$) that is a time when $\Delta T$ has elapsed after the time t1. In this case, the monitoring part 11 can obtain a ratio $\Delta S/\Delta T$ as the lower speed transmission ratio, which is a ratio of a period $\Delta S$ in which the linking speed is 5.5 Mbps with respect to the period $\Delta T$ from the time t1 to the time (t1+$\Delta T$). Likewise, at a time (t1+2$\Delta T$), the monitoring part 11 obtains a lower speed transmission ratio during a period from (t1+$\Delta T$) to (t1+2$\Delta T$), and at a time (t1+3$\Delta T$), the monitoring part 11 obtains a lower speed transmission ratio during a period from (t1+2$\Delta T$) to (t1+3$\Delta T$).

The monitoring part 11 records a lower speed transmission ratio in the priority table 14 every time the lower speed transmission ratio is obtained. At the time, the monitoring part 11 may be allowed to delete the oldest value of the lower speed transmission ratio recorded in the priority table 14, so that the latest two values of the lower speed transmission ratio are recorded therein at all the time. Further, the monitoring part 11 records a lower speed transmission ratio by monitoring the transmission condition, regarding each of the transmissions indicated by the higher priority transmission identifiers recorded in the priority table 14.

It should be noted that here an example in which the monitoring part 11 monitors the transition of the link speed and obtains the lower speed transmission ratio as transmission condition data, but the transmission condition data are not limited to the above-described example. For example, the monitoring part 11 measures how many times the same packet is retransmitted by the wireless LAN interface 18, obtains the packet retransmission ratio at predetermined time intervals, and records the obtained packet retransmission ratio as transmission condition data in the priority table 14.

In Op201, the monitoring part 11 records the transmission condition data in the priority table 14, and the lower priority transmission identifying part 15 initializes a variable i to "1" (Op202). Then, the lower priority transmission identifying part 15 refers to transmission condition data of a transmission indicated by priority transmission identifier recorded at the i'th time (hereinafter such a transmission is referred to as the i'th transmission), among the higher priority transmissions recorded in the priority table 14 (Op203). In the case of i=1, for example, the transmission condition data "4%, 9%" are referred to, among data in the first row in the priority table 14 shown in FIG. 2, that is, the data in the row with the "Number" being "1".

The lower priority transmission condition identifying part 15 determines, from the transmission condition data thus referred to, whether or not the transmission condition continuously degrades (Op204). For example, when recently obtained both of two values of the lower speed transmission ratio exceed a threshold value, it can be determined that the transmission condition has degraded. More specifically in the case where the threshold value is 10% and i=2, when the transmission condition data are "11%, 12%" like the data in the second row of the priority table 14 shown in FIG. 2, it is determined that the transmission condition has continuously degraded. It should be noted that the foregoing determination of the degradation of the transmission condition is an example, and such determination is not limited to this. For example, the monitoring part 11 records a lower speed transmission ratio obtained by ten times of measurement as transmission condition data, and the lower priority transmission identifying part 15 may determine that the transmission condition has degraded, when five or more among the ten measured values of the lower speed transmission ratio exceeded a threshold value.

When it is determined that the transmission condition has continuously degraded (Yes in Op204), the lower priority transmission identifying part 15 determines whether or not the bandwidth available for a transmissions of the AP 1 with a wireless terminal is insufficient (Op205). The determination procedure of the shortage of the bandwidth will be described later in more detail. When the bandwidth is insufficient (Yes at Op205), the i'th transmission is identified as a lower priority transmission, and this is recorded as such in the priority table 14. In the case of, for example, i=2, the lower priority transmission identifying part 15 updates the transmission priority in the data in the second row (Number=2) in the priority table 14 to "Lower priority" as shown in FIG. 2.

This causes the transmission recorded in the second row of the priority table 14 to be treated as a lower priority transmission. More specifically, the priority control part 16 causes the wireless LAN interface 18 to relay the transmission with a "Higher priority" in the priority table 14 by priority compared with the transmission with a "Lower priority". For example, the priority control part 16 assigns priorities to the transmissions so that the priority of the transmission with "Higher priority" as the transmission priority is raised as compared with the transmission with a "Lower priority". Then, the priority control part 16 instructs the wireless LAN interface 18 to transmit packets to the wireless terminals in the decided priority order. With this, the bandwidth that would have been used for the lower priority transmission for which the transmission condition has degraded is available for the higher priority transmission. Therefore, a reduction of the transmission quality of the higher priority transmission can be prevented.

Further, the lower priority transmission identifying part 15 obtains, from the priority table 14, the transmission identifier indicating the transmission identified as a lower priority transmission, and notifies the copy to the packet transmission control part 17. This allows the packet transmission control part 17 to reduce the amount of data of the packets transmitted to the wireless terminal in the lower priority transmission. An exemplary operation of the packet transmission control part 17 will be described later.

On the other hand, when it is not determined in Op204 that the transmission condition has degraded continuously, the lower priority transmission identifying part 15 determines whether or not the transmission condition of the transmission concerned (i.e. the i'th transmission) has been good continuously and whether the transmission priority thereof is "Higher priority" or "Lower priority" (Op207). When it is determined that the transmission condition has been good continuously and the transmission priority is "Lower priority", the priority table 14 is updated so that the transmission priority of the transmission concerned is changed from "Lower priority" to "Higher priority" (Op208). By so doing, when the transmission condition of the transmission whose transmission priority has been registered as "Lower priority" is recovered, the transmission priority of the transmission is switched from "Lower priority" to "Higher priority".

Through the operations Op203 to Op208 described above, the transmission condition of the i'th transmission is checked, and the transmission priority thereof, "Higher priority" or "Lower priority", is switched according to the transmission condition and the availability of the bandwidth. The operations Op203 to Op208 described above are performed repeatedly until all the transmissions indicated by the higher priority transmission identifiers recorded in the priority table 14 are subjected to the foregoing operations (Yes in Op209). Thus, the lower priority transmission identifying part 15 is allowed to check the transmission condition regarding each of the transmissions indicated by the higher priority transmission identifier recorded in the priority table 14, and when the bandwidth is insufficient, identifies a transmission under a degraded transmission condition as a lower priority transmission. The above-described operations Op201 to Op209 are performed repeatedly unless a command for stopping the operation of the AP 1 is issued (unless the result of the determination in Op210 is "Yes").

Here, an exemplary operation of the lower priority transmission identifying part 15 in Op205 for determining whether or not the bandwidth is insufficient is described. The lower priority transmission identifying part 15 calculates the total bandwidth used for the transmissions as a whole indicated by the higher priority transmission identifier, and determines that the bandwidth is insufficient in the case where the total bandwidth in use exceeds a predetermined threshold. The lower priority transmission identifying part 15, for example, calculates a bandwidth in use regarding each of the transmissions indicated by the higher priority transmission identifiers recorded in the priority table 14, and assumes a sum of bandwidths allocated to all of the transmissions as the total bandwidth in use. Here, the bandwidth in use per one transmission may be calculated based on the transmission configuration (e.g., codec) and the data transfer speed (e.g., link speed). A predetermined fixed value may be used as the bandwidth in use per one transmission. Alternatively, since the link speed varies with the transmission condition in the AP 1 according to the present embodiment, the transmission condition data recorded in the priority table 14 may be used in the calculation of the bandwidth in use.

For example, when the link speed is 11 Mbps in a VoIP (Voice over Internet Protocol) transmission in which the codec is G.711, the allocated bandwidth, which is the total transferred data per unit time, can be determined to be 128 kbps. Transfer of a certain amount of data at the link speed of 5.5 Mbps requires a time twice the time required for transferring the same amount of data at the link speed of 11 Mbps. Therefore, when the link speed is 5.5 Mbps, the bandwidth used for the foregoing transmission can be determined to be twice, i.e., 256 kbps. In order to determine the bandwidth used for the transmission, the lower priority transmission identifying part 15 obtains, for example, a bandwidth to be used and information regarding codec (e.g., SDP in SIP) from packets of an originated message in call control (e.g., INVITE message in SIP), and further determines a link speed based on the lower speed transmission ratio of the transmission condition data of the priority table 14.

The lower priority transmission identifying part 15 can determine that the bandwidth is insufficient when the total bandwidth in use determined in the above-described procedure exceeds a predetermined threshold. The predetermined threshold may be an upper limit of the bandwidth allocated to the higher priority transmissions among the bandwidth available for the AP 1. The upper limit may be set preliminarily by a user based on the performance of the AP 1, the environment for the copy, etc.

It should be noted that the representation of the bandwidth is not limited to the transferred data amount per unit time as described above. For example, the bandwidth may be represented by a ratio of a bandwidth to the entire bandwidth available for transmissions, or by a value based on the number of terminals used in transmissions. When the bandwidth is managed based on the number of terminals used in transmissions, for example, the management may be performed based on the number of terminals that are performing transmissions at the maximum speed and the number of terminals that are performing transmissions at lower speeds than that. When it can be assumed that applications of all the terminals are allowed to use the same bandwidth, the bandwidth used by the terminals performing transmissions at the maximum speed may be represented by a certain number, e.g. "1", while the bandwidth used by the terminals performing transmissions at lower speeds than that may be represented by "2", i.e., the number having a value twice that of the foregoing certain number. The bandwidth management may be performed by using a sum of the foregoing numbers as a value representing the total bandwidth in use. In this case, the accuracy decreases in the bandwidth calculation, but this makes it possible to perform the calculation simply and quickly.

Figure 6:
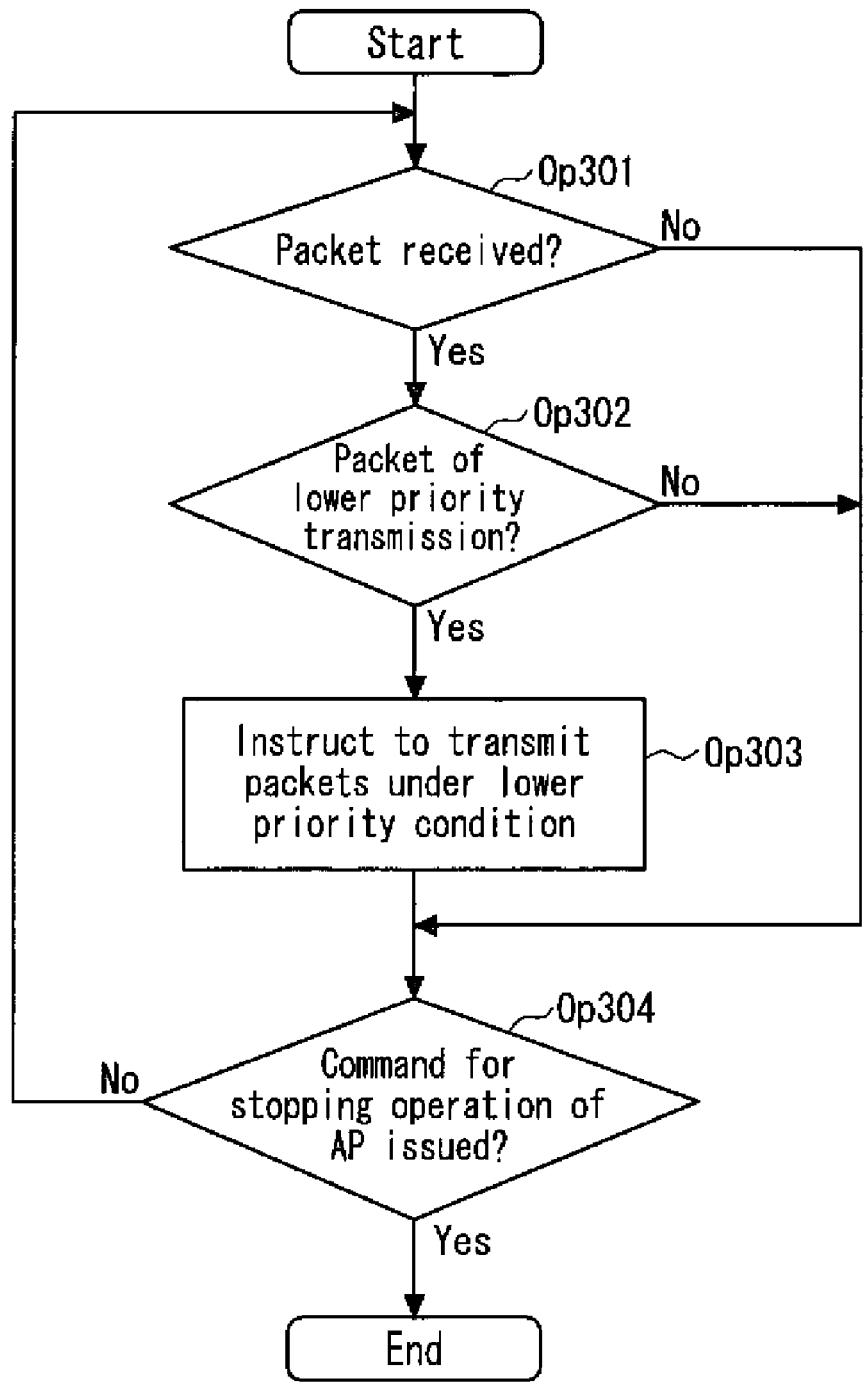
FIG. 6 is a flowchart showing exemplary operations of a packet transmission control part.

Next, an exemplary operation of the packet transmission control part 17 will be described. FIG. 6 is a flowchart showing an exemplary operation of the packet transmission control part 17. In FIG. 6, the packet transmission control part 17 detects the reception of packets to be transmitted to the wireless terminal 2a or 2b by monitoring packets received by the wireless LAN interface 18 (Op301). When the wireless LAN interface 18 receives packets to be transmitted to the wireless terminal 2a or 2b (Yes in Op301), the packet transmission control part 17 determines whether or not the packets are those of a lower priority transmission (Op302). This determination can be performed by determining whether or not the transmission identifier for those packets is recorded in the lower priority table 171. When the packets are those of a lower priority transmission (Yes in Op302), the packet transmission control part 17 instructs the wireless LAN interface 18 to transmit the packets to the wireless terminal 2a or 2b under a lower priority condition (Op303). For example, the packet transmission control part 17 instructs the wireless LAN interface 18 to decrease a transmission quality upon the packet transmission, thereby causing the packets to be transmitted under a lower priority condition. The following describes three specific examples of the method for transmitting packets under a lower priority condition.

The first specific example is a method in which a part of packets of a lower priority transmission to be transmitted to the wireless terminal is discarded. In this case, the packet transmission control part 17 instructs the wireless LAN interface 18 that in receiving packets of a lower priority transmission registered in the lower priority table, for example, when receiving ten of the packets, the two last ones of the ten should be discarded without being transmitted. This makes it possible to decrease the number of transmitted packets by 20%. It should be noted that the amount of discarded packets is not limited to this. Besides, preferably the wireless terminal 2a or 2b has a compensating function for compensating the sound quality so that the sound quality should not degrade even if a part of packets does not arrive. The packet transmission control part 17 may change the ratio of packets to be discarded, according to the performance of the compensating function of the wireless terminal 2a or 2b.

The second specific example is a method in which the transmission is continued in half-duplex. The packet transmission control part 17 can stop the transmission from the AP 1 to the wireless terminal 2a or 2b by, for example, discarding voice packets transmitted from the AP 1 to the wireless terminal 2a or 2b. This causes the transferred data amount per one terminal to decrease to half. However, when the voice packets do not reach the wireless terminal during a telephone call, sometimes the wireless terminal side determines that the telephone call is disconnected. Therefore, the packet transmission control part 17 causes the wireless LAN interface 18 to transmit a dummy packet. More specifically by the packet transmission control part 17, a voice packet containing no sound, to which necessary information is attached in the header of the packets, is transmitted as a dummy packet from the AP 1 to the wireless terminal 2a or 2b.

Further, the configuration may be such that a push button may be provided in the wireless terminal 2a or 2b, so that voice packets for voice from the wireless terminal 2a or 2b are transmitted to the AP 1 exclusively while the push button is being pressed by a user, and no voice packet is transmitted while the button is not pressed. In this case, the packet transmission control part 17 may cause voice packets to be transmitted to the wireless terminal 2a or 2b while voice packets are arriving from the wireless terminal 2a or 2b to the AP 1, and cause a dummy packet to be transmitted to the wireless terminal 2a or 2b while no voice packet is arriving from the wireless terminal 2a or 2b.

The third specific example is a method in which the priority order instructed by the priority control part 16 is changed. In this example, the wireless LAN interface 18 transmits packets to a wireless terminal, according to the priority order designated by the priority control part 16. Further, the packet transmission control part 17 instructs the wireless LAN interface 18 so that the packets of a lower priority transmission registered in the lower priority table 171 are transmitted with the transmission priority being descended temporarily. This causes the packets of the lower priority transmission registered in the lower priority table 171 to temporarily assume the lowest transmission priority. Here, the information regarding the transmission priorities registered in the priority table 14 is not changed. When receiving packets of a transmission registered in the lower priority table 171, the wireless LAN interface 18 transmits the packets, with the lowest transmission priority. This makes it possible to omit the operation by the priority control part 16 for descending the transmission priority of the lower priority transmission.

It should be noted that the method for transmitting packets under a lower priority condition is not limited to the foregoing first to third specific examples. The operations Op301 to Op303 are performed repeatedly unless a command for stopping the operation of the AP 1 is issued (unless the result of the determination in Op304 is "Yes").

Embodiment 2

The present embodiment is a modification of the operation of the AP 1 according to Embodiment 1. FIG. 7 shows a data configuration of a priority table 14a according to the present embodiment. The priority table 14a shown in FIG. 7 has the same configuration as that of the priority table 14 (see FIG. 2) shown as an example according to Embodiment 1 except that a column for storing data relating to the "Duration of degradation" is added. The duration of degradation is a time period while a transmission is kept continuously in a state under a degraded transmission condition. The data representing the duration of degradation are not necessarily represented in units of hour, minute, second, or the like, but may assume values that enable comparison with the other transmissions.

Further, Embodiment 1 is described by referring to an example in which each transmission priority in the priority table 14 is recorded with data representing either one of two levels, "Higher priority" and "Lower priority". In contrast, as an example of the present embodiment, a case where each transmission priority in the priority table 14a is recorded with data representing either one of three levels, "Higher priority transmission" (hereinafter referred to as "Higher priority"), "Transmission under a degraded transmission condition" (hereinafter referred to as "Degraded"), and "Lower priority transmission" (hereinafter referred to as "Lower priority").

In the present embodiment, when the priority transmission identifier indicating a transmission to be relayed by priority is recorded in the priority table 14a, the bandwidth management part 12 records "Higher priority" as the transmission priority of the transmission. When the transmission condition for the transmission with the "Higher priority" degrades, the monitoring part 11 updates the transmission priority of the foregoing transmission to "Degraded". When the bandwidth of the AP 1 is insufficient, the lower priority transmission identifying part 15 updates the transmission priority of a transmission having a higher degradation degree of the transmission condition among the transmissions with transmission priorities of "Degraded" to "Lower priority". The priority control part 16 relays a transmission with a "Higher priority" or a transmission priority of "Degraded" by priority compared with a transmission with a "Lower priority". This makes it possible to perform control so that a transmission under a degraded transmission condition is treated as a lower priority transmission when the bandwidth is insufficient. The packet transmission part 17 transmits packets of a lower priority transmission to a wireless terminal under a lower priority condition.

Figure 8:
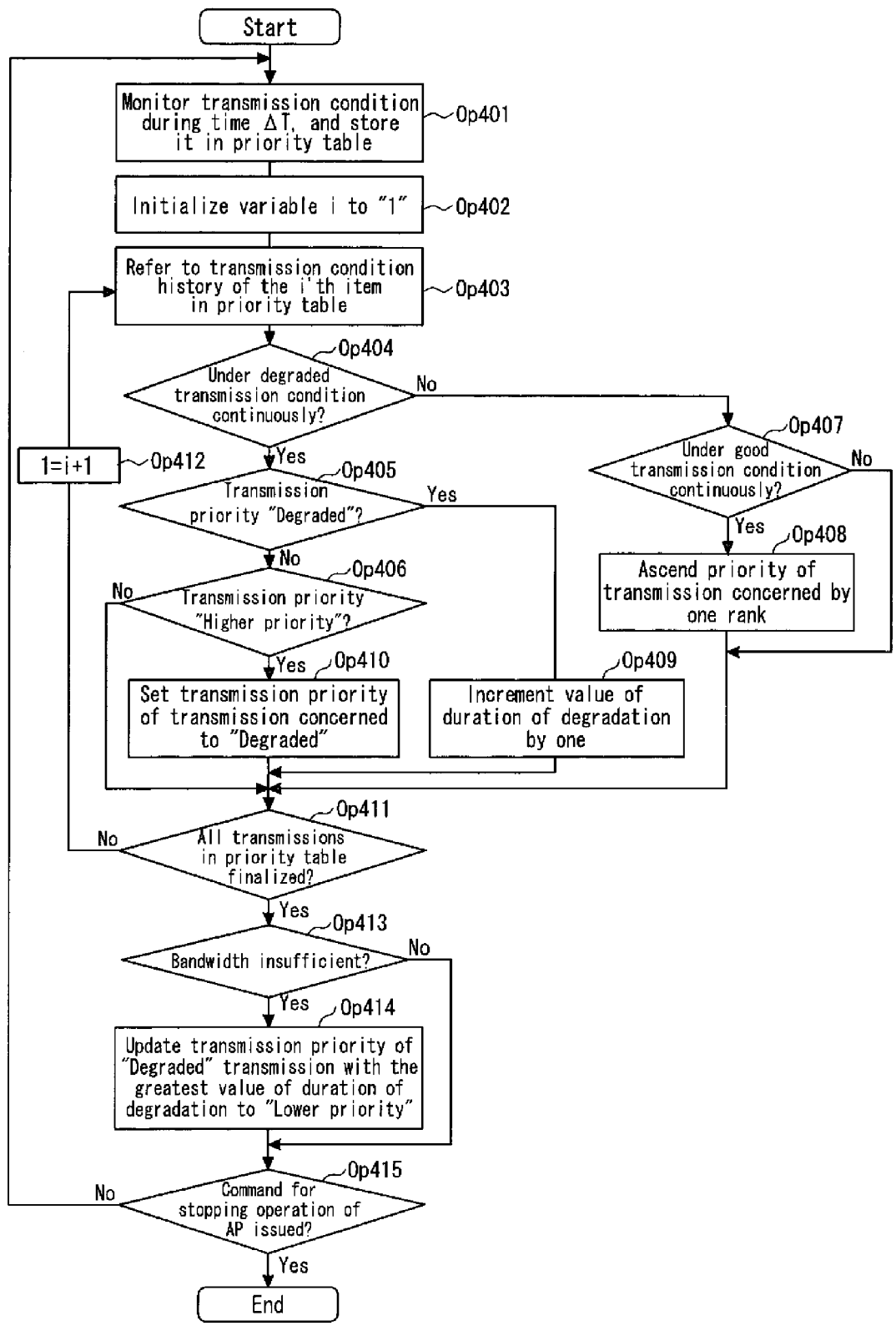
FIG. 8 is a flowchart showing operations according to Embodiment 2 of the monitoring part and the lower priority transmission identifying part.

FIG. 8 is a flowchart showing operations of the monitoring part 11 and the lower priority transmission identifying part 15 of the AP 1 in the present embodiment. In FIG. 8, operations Op401 to 404 are identical to the operations Op201 to Op204 shown in FIG. 4. When it is determined in Op404 that the transmission condition for the i'th transmission has continuously degraded (in the case of Yes), the lower priority transmission identifying part 15 determines whether or not the transmission priority of the i'th transmission is "Degraded" (Op405). When the foregoing transmission has a transmission priority of "Degraded" (Yes in Op405), the lower priority transmission identifying part 15 adds "1" to the value indicating the duration of degradation (Op409). On the other hand, when the transmission priority of the foregoing transmission is not "Degraded" (in the case of No in Op405) and the foregoing transmission is determined to be a "higher priority transmission" (Yes in Op406), the lower priority transmission identifying part 15 updates the transmission priority of the foregoing transmission to "Degraded" (Op410).

On the other hand, it is determined in Op404 that the transmission condition for the i'th transmission has not continuously degraded (in the case of No), the lower priority transmission identifying part 15 determines whether or not the transmission condition of the foregoing transmission has been good continuously (Op407). When the transmission condition has been good continuous (Yes in Op407), the lower priority transmission identifying part 15 ascends the transmission priority of the foregoing transmission. For example, when the transmission priority thereof has been "Degraded", the transmission priority is updated to "Higher priority"; when the transmission priority thereof is "Lower priority", it is updated to "Degraded".

Through the operations Op403 to Op410 described above, the transmission priority of the i'th transmission is updated according to the transmission condition data. The operations Op403 to Op410 are performed repeatedly until all the transmissions indicated by the higher priority transmission identifiers recorded in the priority table 14a are subjected to the operations (Yes in Op411).

When the foregoing repetition of operations is completed, the lower priority transmission identifying part 15 determines whether or not the bandwidth available for the transmission of the AP 1 with a wireless terminal is insufficient (Op413). This operation for determining the shortage of bandwidth is identical to the operation Op205 shown in FIG. 4. When the bandwidth is insufficient (Yes in Op413), the lower priority transmission identifying part 15 updates the transmission priority of a transmission with the greatest value of the duration of degradation, among transmissions of transmission priorities of "Degraded" in the priority table 14a, to 'tower priority' (Op414). Consequently the transmission priority of a transmission under a transmission condition of a higher degradation degree, among the transmissions with the transmission priorities of "Degraded", is updated to "Lower priority".

Thereafter, unless a command for stopping the operation of the AP 1 (unless the result of the determination in Op415 is "Yes"), the operations Op401 to Op415 are performed repeatedly. As described above, through the operations shown in FIG. 8, the transmission priority of each of transmissions recorded in the priority table 14a can be set to either one of the three states, i.e. "Higher priority", "Degraded", and "Lower priority", according to the transmission condition thereof. This makes it easier to identify a transmission under a degraded transmission condition.

It should be noted that in the operations shown in FIG. 8, the lower priority transmission identifying part 15 identifies a transmission having a transmission priority of "Degraded" in a long duration as a lower priority transmission when the bandwidth is insufficient. Alternatively, the lower priority transmission identifying part 15 may disconnect the transmission and delete the data indicating the transmission from the priority table 14a, instead of reassigning the priority of the transmission to lower priority. In this case, the state thereof in which the transmission priority thereof is "Lower priority" no longer exists.

Embodiment 3

Figure 9:
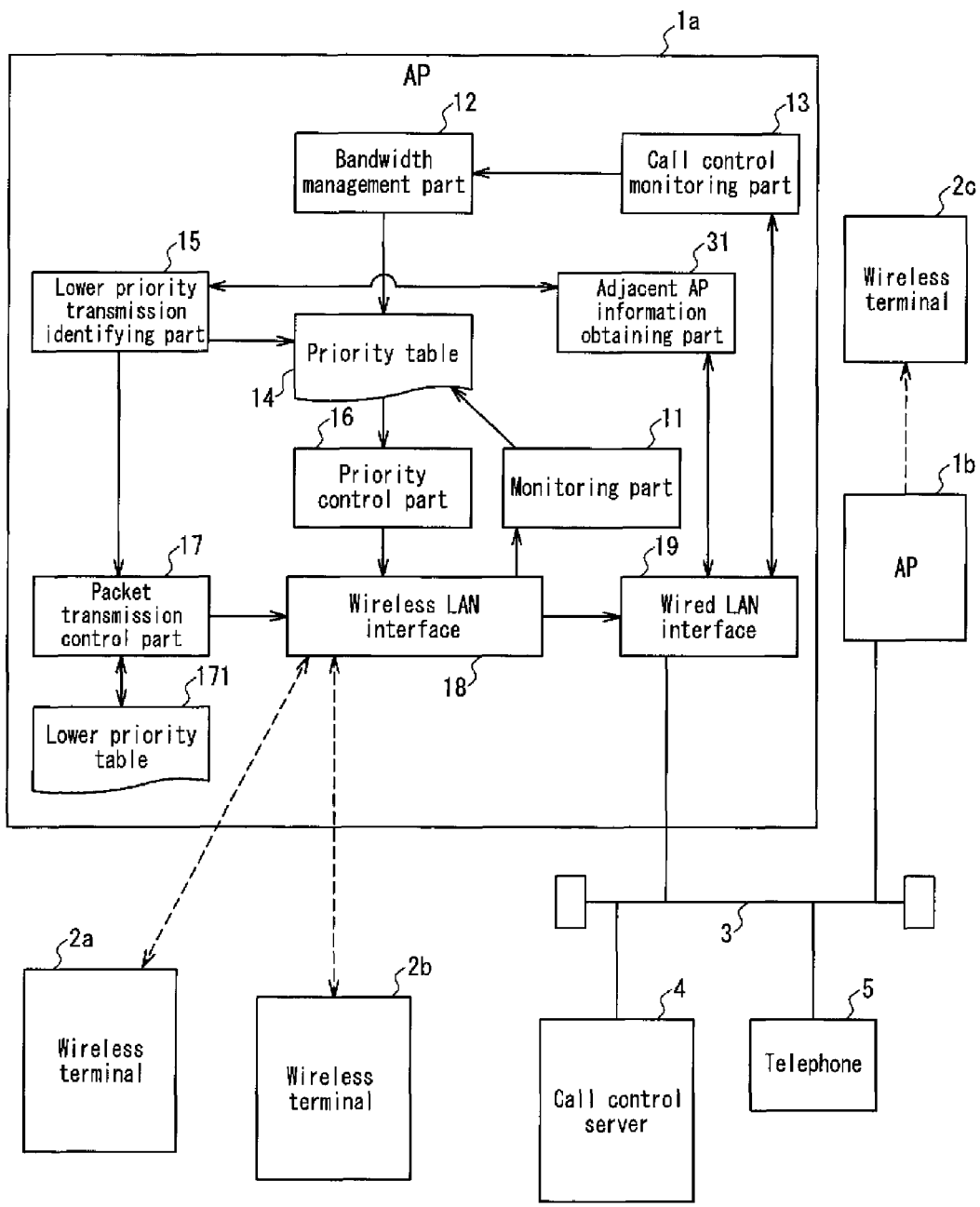
FIG. 9 is a functional block diagram showing a configuration of a communication system including an AP according to Embodiment 3.

FIG. 9 is a functional block diagram illustrating a configuration of an AP according to the present embodiment together with an overall configuration of the entire communication system incorporating the foregoing AP. Among the functional blocks shown in FIG. 9, those identical to the functional blocks shown in FIG. 1 are designated by the same reference numerals and descriptions of the functional blocks are omitted. An AP 1a shown in FIG. 9 has the same configuration as that of the AP 1 shown in FIG. 1 except that an adjacent AP information obtaining part 31 is added. Besides, not only the AP 1a but also the AP 1b are connected to the wired LAN 3. The AP 1a and the AP 1b are provided adjacent to each other at a distance such that radio waves transmitted from them interfere with each other. In the coverage area of the AP 1b, a wireless terminal 2c exists. The internal configuration of the AP 1b is identical to that of the AP 1a.

Operations of the AP 1a and the AP 1b according to the present embodiment are identical to those shown in FIGS. 3 and 4 except for the following points. In the operations of the AP 1a and the AP 1b according to the present embodiment, an operation for determining the shortage of the bandwidth shown in FIG. 4 by the lower priority transmission identifying part 15 (Op205) is different from that of Embodiment 1. This operation is described below.

The adjacent AP information obtaining part 31 obtains, via the wired LAN 3, an adjacent bandwidth in use that is indicative of a bandwidth used in radio transmissions by the adjacent AP 1b. For example, a total bandwidth in use calculated by the lower priority transmission identifying part 15 of the adjacent AP 1b may be obtained as an adjacent bandwidth in use. The calculation of the total bandwidth in use is identical to that according to Embodiment 1. It should be noted that the method for deriving the total bandwidth in use in the adjacent AP 1b is not limited to this. The total bandwidth in use may be derived by, for example, counting the number of packets or bytes actually relayed by the AP 1b.

The lower priority transmission identifying part 15 of the AP 1a uses the adjacent bandwidth in use for the AP 1b adjacent thereto, which has been obtained by the adjacent AP information obtaining part 31, when determining whether or not the bandwidth for the AP la is insufficient. More specifically, the lower priority transmission identifying part 15 determines the shortage of the bandwidth by comparing a sum of the total bandwidth in use for the AP 1a and a value obtained by multiplying the adjacent bandwidth in use for the AP 1b adjacent to the AP 1a by a coefficient and a predetermined threshold value. The coefficient and the threshold value are recorded in a recording device of the AP 1a preliminarily. The foregoing threshold value is, for example, an upper limit of a bandwidth allocated to higher priority transmissions in the AP 1a, like in Embodiment 1. The foregoing coefficient is a value indicative of a degree of the influence by the AP 1b adjacent thereto. The coefficient may be a value according to a difference between the frequency bandwidth used in radio transmission by the AP 1a and the frequency bandwidth used in radio transmission by the AP 1b.

FIG. 10 is a table showing an exemplary relationship of the difference between channel numbers of APs adjacent to each other with the value indicative of the degree of influence of one AU on the other adjacent AP. The channel numbers shown in the table of FIG. 10 are numbers for identification of frequency bandwidths allocated to radio transmissions by APs. The greater the difference between the channel numbers is, the greater the difference between the frequency bandwidths is. This table shows that the influence degree is "100%", i.e., the largest, when the difference between channel number is "0", and as the difference between channel numbers increases, the influence degree decreases.

Values obtained by dividing the influence degrees shown in the table of FIG. 10 by 100 are recorded with respect to the channel number differences "0", to "4", respectively, whereby the lower priority transmission identifying part 15 is allowed to use each of these values as the foregoing coefficient. For example, when the difference between the channel numbers of the AP 1a and the AP 1b is "2", the lower priority transmission identifying part 15 is allowed to determine whether or not the bandwidth is insufficient, by determining whether or not a sum of a value obtained by multiplying the adjacent bandwidth in use for the AP 1b by the coefficient "0.6" and the total bandwidth in use for the AP 1a exceeds a threshold value. Thus, the determination can be made with the influence of the adjacent AP 1b being taken into consideration.

Embodiment 4

Figure 11:
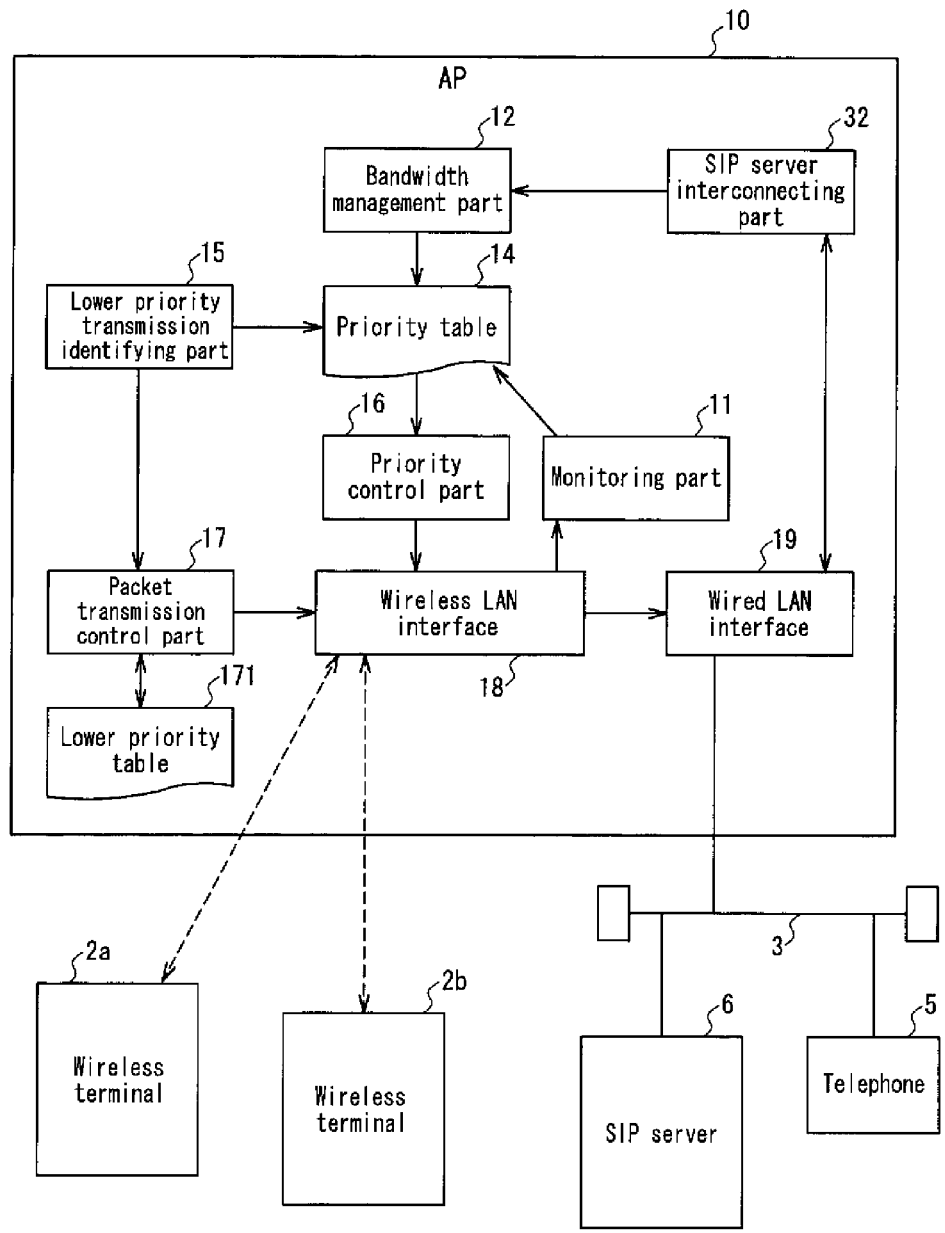
FIG. 11 is a functional block diagram showing a configuration of a communication system including an AP according to Embodiment 4.

FIG. 11 is a functional block diagram showing a configuration of an AP according to the present embodiment together with an overall configuration of the entire communication system incorporating the foregoing AP. Among the functional blocks shown in FIG. 11, those identical to the functional blocks shown in FIG. 1 are designated by the same reference numerals and descriptions of the functional blocks are omitted. An AP 10 shown in FIG. 11 has a configuration identical to that of the AP 1 shown in FIG. 1 except that the call control monitoring part 13 is replaced with a SIP server interconnecting part 32. The call control server 4 is connected with the wired LAN 3 in FIG. 1, but in the present embodiment, a SIP server 6, in place of the call control server 4, is connected with the wired LAN 3. The SIP server 6 is an example of a transmission control device. The SIP server 6 controls transmissions between any two or more terminals among wireless terminals 2a and 2b within the coverage area of the AP 10 and a telephone 5 connected with the wired LAN 3 according to SIP (Session Initiation Protocol).

The SIP server interconnecting part 32 of the AP 10 performs transmission/reception of SIP messages with the SIP server 6 via a wired LAN interface 19. The SIP server interconnecting part 32 receives, for example, a request message for requesting bandwidth reservation or bandwidth allocation for relaying a specific transmission by priority. The SIP server interconnecting part 32 transmits, to the SIP server 6, a request message for requesting a change in the bandwidth in use for a transmission relayed by priority.

Figure 12:
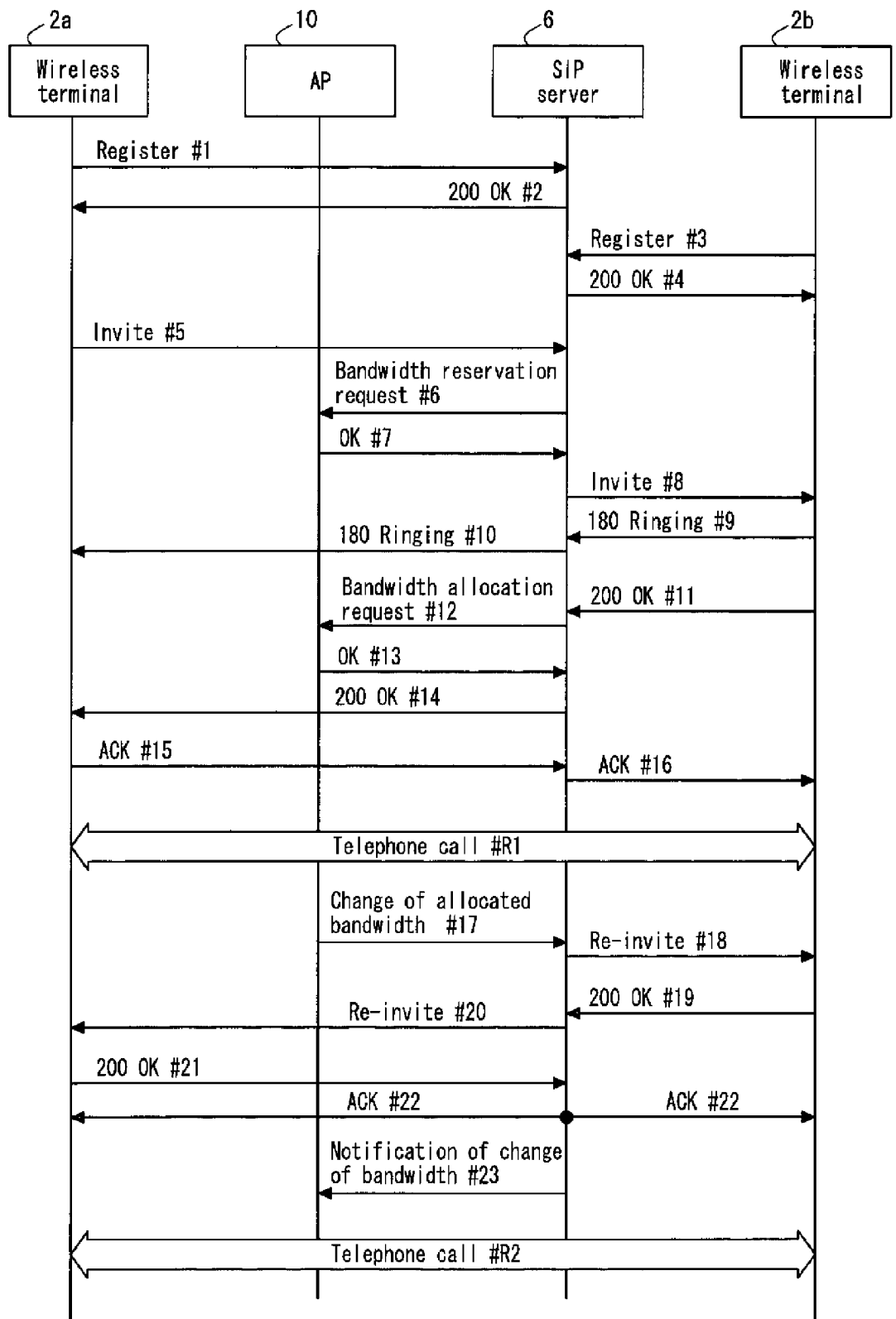
FIG. 12 illustrates exemplary operations of a communication system when a transmission is performed by wireless terminals.

Next, an exemplary operation of a communication system in the case where a telephone call is made between the wireless terminals 2a and 2b will be described. FIG. 12 shows an exemplary operation of the communication system in the case where a transmission is made between the wireless terminals 2a and 2b shown in FIG. 11. FIG. 12 shows, as an example, an operation of the communication system in the case where a telephone call is started between the wireless terminals 2a and 2b accessible to the AP 10 and the shortage of bandwidth occurs with the AP 10 during the telephone call.

When the wireless terminal 2a is activated within a coverage area of the AP 10, the wireless terminal 2a transmits a Register message to the SIP server 6 (#1). The Register message contains, for example, terminal information such as positional information (e.g., an IP address, a port number, etc.) of the wireless terminal 2a and an identifier (e.g., a telephone number, a user ID, an SIP address, etc.) for calling the wireless terminal 2a. The SIP server 6 records the terminal information contained in the Register message in a recording device (not shown) accessible from the SIP server 6. When the SIP server 6 succeeds in this storing, the SIP server 6 transmits a "200 OK" message to the wireless terminal 2a (#2).

Similarly, the wireless terminal 2b transmits a Register message to the SIP server 6 (#3). The SIP server 6 records the terminal information of the wireless terminal 2b, and transmits a "200 OK" message to the wireless terminal 2b (#4). The Register message and the OK message are those that are defined by the SIP. Furthermore, Invite, Re-Invite, Ringing, and ACK messages described below are also those that are defined by the SIP.

The wireless terminal 2a transmits an Invite message for the wireless terminal 2b to the SIP server 6 (#5). Consequently, the wireless terminal 2a requests the SIP server 6 to start transmission with the wireless terminal 2b. The Invite message contains a codec data representing a codec in transmission ready to be started, in addition to a transmission identifier representing transmission ready to be started. The codec data is contained, for example, in the Invite message in a form according to a SDP (Session Description Protocol). Hereinafter, data in a form according to an SDP contained in the Invite message is referred to as SDP data. The SDP data may contain, for example, a medium type data representing types of media of streams included in a transmission. Examples of the media type data include an audio, a character, a moving picture, a still picture, and pointing position information.

The SIP server 6 having received the Invite message identifies the positions of the wireless terminals 2a, 2b with reference to data of the recording device. Consequently, the SIP server 6 identifies that the AP that relays the transmission ready to be started is the AP 10. The SIP server 6 requests the AP 10 to make a bandwidth reservation for a transmission ready to be started (#6). More specifically, the SIP server 6 requests the AP 10 to relay, by priority, the transmission ready to be started. At this time, the SIP server 6 transmits a transmission identifier for the transmission ready to be started, and SDP data contained in the Invite message to the AP 10.

The SIP server interconnecting part 32 of the AP 10 receives a request for a bandwidth reservation, and the bandwidth management part 12 determine whether or not to accept the reservation. This determination can be performed in the same manner as that according to Embodiment 1. When the request for the reservation is accepted, the bandwidth management part 12 records a transmission identifier of a transmission ready to be started as a priority transmission identifier in the priority table 14, and additionally the data representing that bandwidth allocation is being reserved. Consequently, a bandwidth allocation is reserved. When the bandwidth is reserved, the SIP server interconnecting part 32 transmits a "200 OK" message to the SIP server 6, as a response to the request for reserving a bandwidth allocation (#7). On the other hand, when the reservation of a bandwidth allocation is impossible, the SIP server interconnecting part 32 transmits an error message to the SIP server 6.

When the SIP server 6 receives the OK message, the SIP server 6 transmits an Invite message to the wireless terminal 2b (#8). When the AP 10 fails in reserving a bandwidth allocation, and the SIP server 6 receives an error message, the SIP server 6 may, for example, transmit a disconnection message to the wireless terminal 2a without starting the transmission between the wireless terminals 2a, 2b.

The wireless terminal 2b having received the Invite message from the SIP server 6 transmits a "180 Ringing" message representing "during calling" to the SIP server 6 (#9). The "180 Ringing" message received by the SIP server 6 is transmitted to the wireless terminal 2a (#10).

When a user of the wireless terminal 2b performs an operation of accepting a request for the starting of transmission with respect to the wireless terminal 2b, a "200 OK" message is transmitted from the wireless terminal 2b to the SIP server 6 (#11). The SIP server 6 requests the AP 10 to allocate a bandwidth for transmission ready to be started (#12). Because of this, the bandwidth management part 12 of the AP 10 finalizes the allocation of a bandwidth reserved in #6. Consequently, in the AP 10, voice packets to be transferred for the transmission between the wireless terminals 2a and 2b are relayed by priority compared with the other packets.

When the bandwidth allocation is finalized, the SIP server interconnecting part 32 transmits an OK message to the SIP server 6 as a response to the request for the bandwidth allocation (#13). The SIP server 6 transmits a "200 OK" message to the wireless terminal 2a (#14). The wireless terminal 2a having received the "200 OK" message transmits an ACK message to the wireless terminal 2b via the SIP server 6 (#15, #16). Because of this, a telephone call (#R1) is started between the wireless terminals 2a, 2b. This telephone call is performed in accordance with, for example, RTP/AVP (Real-time Transport Protocol using Audio Video Profile).

While this telephone call (#R1) is performed, the operations shown in FIG. 4 according to Embodiment 1 or the operations shown in FIG. 8 according to Embodiment 2 are performed in the AP 10. More specifically, the transmission states between the wireless terminal 2a, 2b and the AP 10 performing the telephone call are monitored by the monitoring part 11. The lower priority transmission identifying part 15 identifies a transmission under a degraded transmission condition as a lower priority transmission when the bandwidth for the AP 10 is insufficient, and causes the foregoing transmission to be relayed under a lower priority condition.

Here, if the transmission of the telephone call (#R1) is identified as a lower priority transmission due to the shortage of bandwidth occurring with the AP 10 during the telephone call (#R1), the SIP server interconnecting part 32 transmits a bandwidth change message for requesting a change of a bandwidth used for the transmission of the telephone call (#R1) to the SIP server 6 (#17).

The SIP server 6 having received the bandwidth change message may, for example, change a codec applied to the transmission between the wireless terminal 2a and 2b, so as to change the bandwidth in use. In this case, the SIP server 6 transmits a Re-Invite message containing information of a new codec to the wireless terminal 2b (#18). By so doing, the SIP server 6 notifies the new codec to the wireless terminal 2b. The wireless terminal 2b, if being capable of performing transmission by using the new codec, transmits a "200 OK") message to the SIP server 6 (#19). Similarly, the SIP server 6 also transmits Re-Invite message containing information of the new codec to the wireless terminal 2a (#20). The wireless terminal 2a, if being capable of performing transmission by using the new codec, transmits a "200 OK" message to the SIP server 6 (#21).

The SIP server 6 having received the "200 OK" message from the wireless terminals 2a, 2b transmits an ACK message to the wireless terminals 2a, 2b (#22), and notifies the AP 10 that the bandwidth has been changed (#23). The wireless terminals 2a, 2b, when receiving the ACK message, switch the telephone call (#R1) to a telephone call (#R2) to which the new codec is applied. In other words, the operations for negotiation for changing the codec, shown in #17 to #23 above, are performed concurrently with the telephone call (#R1) between the wireless terminals 2a, 2b.

As an example in which the codec is changed to another, a case may be referred to in which G.711 in PCM (Pulse Code Modulation) is changed to G.729 in CS-ACELP (Conjugate Structure Algebraic Code Excited Linear Prediction). Examples of the codec for videos, which is necessary to videophones, include MPEP-2, MPEP-4, H.263, and the like. Such a codec also can be changed during transmission.

As an exemplary method of the present embodiment for changing the bandwidth in use, an example in which a codec is changed is described, but the method for changing the bandwidth in use is not limited to this. Alternatively, another method may be used in which a medium type of a transmission is changed, for example, a transmission containing video streams and audio streams is changed to a transmission containing either one type of streams exclusively. On the other hand, in some cases, a bandwidth in use is changed for a transmission with, for example, a stereo audio, a shared screen (remote display of a PC screen), etc.

Still further, the exemplary operations shown in FIG. 12 are those in the case where both of the wireless terminals 2a, 2b are present in the coverage area of the AP 10, but in the case where the wireless terminals 2a, 2b access different APs, respectively, the operations performed by the AP 10 and the SIP server 6 (e.g., the operations #6, #7, #12, and #13), shown in FIG. 12, are performed with respect to each of the APs 10.

Embodiment 5

Figure 13:
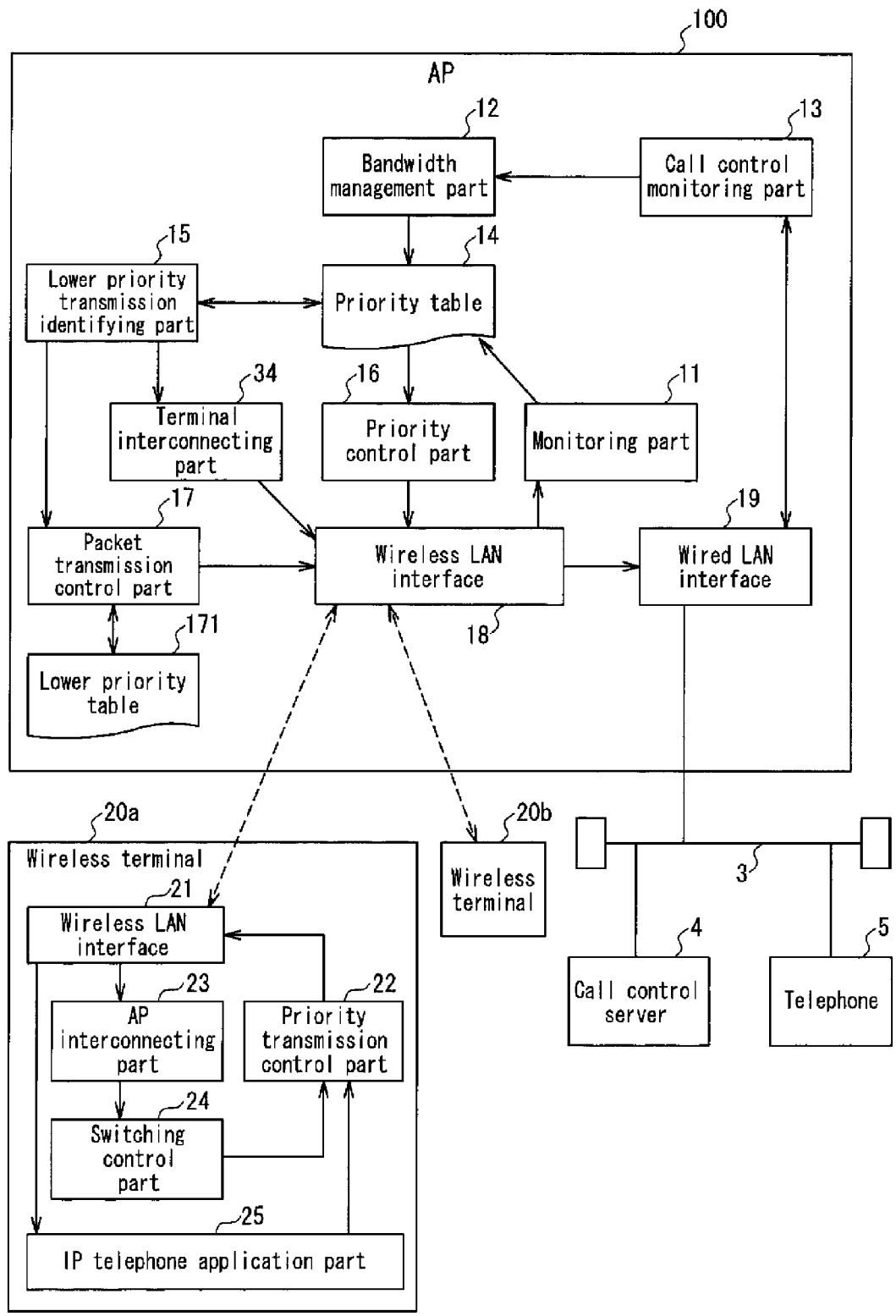
FIG. 13 is a functional block diagram showing a configuration of a communication system including an AP according to Embodiment 5.

FIG. 13 is a functional block diagram showing a configuration of an AP according to the present embodiment together with an overall configuration of an entire communication system incorporating the foregoing AP. Among the functional blocks shown in FIG. 13, those identical to the functional blocks shown in FIG. 1 are designated by the same reference numerals and descriptions of the functional blocks are omitted. AP 100 shown in FIG. 13 has the same configuration as the AP 1 shown in FIG. 1 except that a terminal interconnecting part 34 is provided further.

The terminal interconnecting part 34 notifies information regarding a transmission priority of a transmission to wireless terminals 20a, 20b present in a coverage area of the AP 100. For example, when the lower priority transmission identifying part 15 identifies a lower priority transmission, the terminal interconnecting part 34 notifies it to the wireless terminal that is to perform the lower priority transmission. The terminal interconnecting part 34 instructs the wireless LAN interface 18 to add information relating to the transmission priority of the transmission of the packet to header information of each packet transmitted to the wireless terminal 20a, 20b. Thus, the information relating to the transmission priority of the transmission performed by the wireless terminals 20a, 20b is notified to the wireless terminals 20a, 20b. Consequently, it is possible to control the transmission of packets on the wireless terminal 20a, 20b side also, with the transmission priority of the transmission being taken into consideration.

The wireless terminal 20a includes a wireless LAN interface 21, a priority transmission control part 22, an AP interconnecting part 23, a switching control part 24, and an IP telephone application part 25. The wireless terminal 20b has a configuration identical to that of the wireless terminal 20a.

The wireless LAN interface 21 mediates wireless transmissions of data between the wireless terminal 20a and the AP 100 according to the standard of the wireless LAN. The priority transmission control part 22 transfers packets to be transmitted to the AP 100 to the wireless LAN interface 21. At this time, the priority transmission control part 22 designates the transmission priority (e.g., High or Low) of the packets to be transmitted. The IP telephone application part 25 has a function of causing the wireless terminal 20a to operate as an IP telephone terminal. The IP telephone application part 25 receives packets that the wireless LAN interface 21 has received from the AP 100, and performs an access control in conformity with the specification of the VoIP for the telephone call. Further, the IP telephone application part 25 transfers the packets to be transmitted to the AP 100 to the priority transmission control part 22.

The AP interconnecting part 23 retrieves information relating to the transmission priority notified by the AP 100 from the packets that the wireless LAN interface 21 has received, and transfers the copy to the switching control part 24. At the time, the AP interconnecting part 23 also transfers a transmission identifier that identifies the transmission of the packets, as well as the information relating to the transmission priority, to the switching control part 24. The switching control part 24 gives the priority transmission control part 22 an instruction for switching the transmission priority of the foregoing transmission. The priority transmission control part 22 switches the transmission priority of the transmitted packets of the transmission according to the instruction from the switching control part 24.

The wireless LAN interface 21 has a function of detecting transmission/reception of packets with the AP 100 by another wireless terminal in the coverage area of the AP 100. When detecting that another wireless terminal is transmitting/receiving packets with the AP 100, the wireless LAN interface 21 transmits packets to the AP 100 after waiting for a while. As an algorism for deciding this waiting time, a known algorism is used. The priority transmission control part 22 can perform the priority control by deciding, for each transmission, a waiting time according to the transmission priority of the transmission.

The foregoing configuration allows the wireless terminal 20a to control the transmission priority of a packet transmission based on the information regarding the transmission priority notified by the AP 100. The priority control method for the wireless terminal 20a, 20b, however, is not limited to the method described above.

According to the present embodiment, since the AP 100 has a function of interconnection with the wireless terminals 20a, 20b present in the coverage area thereof, the information relating to the transmission priority according to the transmission condition in the coverage area can be notified to the wireless terminals 20a, 20b. Therefore, on the wireless terminals 20a, 20b side also, the priority control can be performed according to the overall transmission condition of the entire coverage area of the AP 100.

So far, Embodiments 1 to 5 have been described by referring to the case where wireless terminals function as IP telephone terminals, but the function of wireless terminals according to the present embodiment is not limited to this. Examples of terminals to which the present invention is applicable include a video reproducing terminal, a PDA, an electronic organizer, a game machine, and a GPS terminal. Furthermore, a transmission of a wireless terminal controlled by a call control server or a SIP server is not limited to a telephone call. Examples of the transmission of the wireless terminal include a video distribution, a music distribution, an on-line game, a stock price information distribution, a remote presentation, a TV conference, and a monitoring camera image transmission. Furthermore, the number of the wireless terminals, and the number of the APs and the wired terminals connected to the wired LAN 3 are not limited to those shown in examples of the embodiments described above.

In the descriptions of Embodiments 1 to 5, the configurations and operations of an AP for a wireless LAN are described, as examples of a relay apparatus. The relay apparatus according to the present invention, however, is not limited to the AP for the wireless LAN. For example, the relay apparatus of the present invention can also be applied to the AP for a wireless MAN that is a specification of a long distance wireless network determined by WiMAX.

Further, the present invention can be applied to both of an access point of a wireless LAN capable of functioning as a bridge and an access point of a wireless LAN capable of functioning as a router.

The present invention is useful as a relay apparatus for relaying transmissions by a plurality of wireless terminals in a coverage area, in a limited bandwidth.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A relay apparatus for relaying a transmission by a wireless terminal present in a coverage area of the relay apparatus, the relay apparatus comprising:

a priority table for storing a higher priority transmission identifier for identifying a transmission to be relayed by priority, and transmission condition data representing a transmission condition between the relay apparatus and a wireless terminal that is to perform the transmission identified by the higher priority transmission identifier;

a bandwidth management part for receiving a transmission identifier that identifies a transmission that the wireless terminal is to start, and determining whether or not the received transmission identifier should be recorded in the priority table as a higher priority transmission identifier based on a predetermined criterion;

a priority control part for relaying the transmission identified by the higher priority transmission identifier recorded in the priority table, by priority compared with the other transmissions;

a monitoring part for monitoring a transmission condition between the relay apparatus and the wireless terminal that is to perform the transmission identified by the higher priority transmission identifier recorded in the priority table, so as to obtain a value indicating a degree of degradation of the transmission condition at predetermined time intervals and record the obtained value as transmission condition data in the priority table; and a lower priority transmission identifying part for calculating a total bandwidth in use as a sum of a bandwidth used for a transmission identified by a higher priority transmission identifier recorded in the priority table, and when the total bandwidth in use exceeds a predetermined threshold value, selecting as a lower priority transmission a transmission with a higher degree of degradation of a transmission condition than those of the other transmissions, among the transmissions identified by the higher priority transmission identifiers recorded in the priority table, wherein the priority control part relays the transmissions other than the lower priority transmission selected by the lower priority transmission identifying part among the transmissions identified by the higher priority transmission identifiers recorded in the priority table, by priority compared with the lower priority transmission.

2. The relay apparatus according to claim 1, wherein the monitoring part monitors fluctuations of a link speed of a transmission identified by a higher priority transmission identifier recorded in the priority table, and obtains a value indicating a period during which the link speed is lower than a predetermined speed in a predetermined time, as a value indicating a degree of degradation of the transmission condition.

3. The relay apparatus according to claim 1, wherein the monitoring part monitors the number of times of retransmitting packets in a transmission identified by a higher priority transmission identifier recorded in the priority table, and obtains a value indicating the number of times of retransmitting the packets within a predetermined time as a value indicating a degree of degradation of the transmission condition.

4. The relay apparatus according to claim 1, further comprising a packet transmission control part for discarding at least a part of packets to be transmitted to a wireless terminal in the lower priority transmission selected by the lower priority transmission identifying part.

5. The relay apparatus according to claim 1, further comprising a packet transmission control part for discarding packets to be sent to a wireless terminal in the lower priority transmission selected by the lower priority transmission identifying part, and transmitting a dummy packet having a smaller data amount than that of the discarded packets.

6. The relay apparatus according to claim 1, wherein the lower priority transmission identifying part obtains an adjacent bandwidth in use indicating a bandwidth used for a radio transmission by an adjacent relay apparatus, and performing the selection of a lower priority transmission when a sum of the total bandwidth in use and a value obtained by multiplying the adjacent bandwidth in use by a coefficient indicating a degree of influence by the adjacent relay apparatus exceeds the predetermined threshold value.

7. The relay apparatus according to claim 1, wherein the relay apparatus is connected with a transmission control device for controlling transmissions by a plurality of terminals including the wireless terminal, the relay apparatus further comprising a call control part for transmitting, to the transmission control device, a request for reducing a bandwidth used for a lower priority transmission selected by the lower priority transmission identifying part.

8. A relay method for relaying a transmission by a wireless terminal present in a coverage area, the method comprising:

a priority table storing operation for storing, in a priority table, a higher priority transmission identifier for identifying a transmission to be relayed by priority, and transmission condition data representing a transmission condition between the relay apparatus and a wireless terminal that is to perform the transmission identified by the higher priority transmission identifier;

a bandwidth management operation for receiving a transmission identifier that identifies a transmission that the wireless terminal is to start, and determining whether or not the received transmission identifier should be recorded in the priority table as a higher priority transmission identifier based on a predetermined criterion;

a priority control operation for relaying the transmission identified by the higher priority transmission identifier recorded in the priority table, by priority compared with the other transmissions;

a monitoring operation for monitoring a transmission condition between the relay apparatus and the wireless terminal that is to perform the transmission identified by the higher priority transmission identifier recorded in the priority table, so as to obtain a value indicating a degree of degradation of the transmission condition at predetermined time intervals and record the obtained value as transmission condition data in the priority table; and a lower priority transmission identifying operation for calculating a total bandwidth in use as a sum of a bandwidth used for a transmission identified by a higher priority transmission identifier recorded in the priority table, and when the total bandwidth in use exceeds a predetermined threshold value, selecting as a lower priority transmission a transmission with a higher degree of degradation of a transmission condition than those of the other transmissions, among the transmissions identified by the higher priority transmission identifiers recorded in the priority table, wherein in the priority control operation, the transmissions other than the lower priority transmission selected by the lower priority transmission identifying operation, among the transmissions identified by the higher priority transmission identifiers recorded in the priority table, are relayed by priority compared with the lower priority transmission.

9. A non-transitory recording medium storing a relay program for causing a computer to execute processing of relaying a transmission by a wireless terminal present in a coverage area, the relay program causing the computer to execute: priority table storing processing of storing, in a priority table, a higher priority transmission identifier for identifying a transmission to be relayed by priority, and transmission condition data representing a transmission condition between the relay apparatus and a wireless terminal that is to perform the transmission identified by the higher priority transmission identifier; bandwidth management processing of receiving a transmission identifier that identifies a transmission that the wireless terminal is to start, and determining whether or not the received transmission identifier should be recorded in the priority table as a higher priority transmission identifier based on a predetermined criterion; priority control processing of relaying the transmission identified by the higher priority transmission identifier recorded in the priority table, by priority compared with the other transmissions; monitoring processing of monitoring a transmission condition between the relay apparatus and the wireless terminal that is to perform the transmission identified by the higher priority transmission identifier recorded in the priority table, so as to obtain a value indicating a degree of degradation of the transmission condition at predetermined time intervals and record the obtained value as transmission condition data in the priority table; and lower priority transmission identifying processing of calculating a total bandwidth in use as a sum of a bandwidth used for a transmission identified by a higher priority transmission identifier recorded in the priority table, and in the case where the total bandwidth in use exceeds a predetermined threshold value, selecting as a lower priority transmission a transmission with a higher degree of degradation of a transmission condition than those of the other transmissions, among the transmissions identified by the higher priority transmission identifiers recorded in the priority table, wherein in the priority control processing, the transmissions other than the lower priority transmission selected by the lower priority transmission identifying processing, among the transmissions identified by the higher priority transmission identifiers recorded in the priority table, are relayed by priority compared with the lower priority transmission.

* * * * *